(12) United States Patent
Manning

(10) Patent No.: US 10,820,089 B2
(45) Date of Patent: *Oct. 27, 2020

(54) ENIGMA SYSTEM

(71) Applicant: Lloyd Douglas Manning, Banner Elk, NC (US)

(72) Inventor: Lloyd Douglas Manning, Banner Elk, NC (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/105,881

(22) Filed: Aug. 20, 2018

(65) Prior Publication Data
US 2019/0052953 A1 Feb. 14, 2019

Related U.S. Application Data

(63) Continuation of application No. 15/470,861, filed on Mar. 27, 2017, now Pat. No. 10,057,676.

(51) Int. Cl.
| | |
|---|---|
| *H04R 1/10* | (2006.01) |
| *G06F 16/583* | (2019.01) |
| *G06F 9/32* | (2018.01) |
| *G06K 9/00* | (2006.01) |
| *H04R 3/00* | (2006.01) |
| *H04R 1/02* | (2006.01) |
| *G08B 3/10* | (2006.01) |
| *G06F 3/01* | (2006.01) |
| *H04Q 9/00* | (2006.01) |
| *G08C 17/02* | (2006.01) |

(Continued)

(52) U.S. Cl.
CPC ........... *H04R 1/1091* (2013.01); *A63C 17/12* (2013.01); *G06F 1/163* (2013.01); *G06F 3/014* (2013.01); *G06F 16/5838* (2019.01); *G06K 9/00671* (2013.01); *G06K 9/3233* (2013.01); *G08B 3/10* (2013.01); *G08C 17/02* (2013.01); *H04Q 9/00* (2013.01); *H04R 1/021* (2013.01); *H04R 3/00* (2013.01); *A63C 17/01* (2013.01); *A63C 2203/18* (2013.01); *A63C 2203/22* (2013.01); *B63B 32/10* (2020.02); *G08C 2201/93* (2013.01); *H04Q 2209/40* (2013.01); *H04R 2499/11* (2013.01)

(58) Field of Classification Search
None
See application file for complete search history.

(56) References Cited

U.S. PATENT DOCUMENTS 9,060,385 B1 * 6/2015 Manning ............... H04W 84/18
2011/0211760 A1 * 9/2011 Boncyk .................. G06K 9/228
382/190

(Continued)

*Primary Examiner* — Qin Zhu
(74) *Attorney, Agent, or Firm* — William Simmons; Simmons Patents

(57) ABSTRACT

The present invention relates to an enigma system for decoding a user's environment. The system is activated using hand/finger movements and/or voice commands that signal the system to select an item in the user's environment and perform predefined information searches in the local or remote database to located information about the item of interest. The user movements may be detected by an imaging device to eliminate the need for structure to be associated with a user's hand. The enigma system can monitor the user's environment and automatically provide selectable information about the user's environment and provide warnings allowing a user to better "decoded" his environment.

9 Claims, 15 Drawing Sheets

(51) Int. Cl.
*G06F 1/16* (2006.01)
*A63C 17/12* (2006.01)
*B63B 32/10* (2020.01)
*A63C 17/01* (2006.01)
*G06K 9/32* (2006.01)

(56) References Cited

U.S. PATENT DOCUMENTS

| | | | |
|---|---|---|---|
| 2012/0050530 A1* | 3/2012 | Raman | G06F 3/017 |
| | | | 348/142 |
| 2012/0194419 A1* | 8/2012 | Osterhout | G02B 27/0093 |
| | | | 345/156 |
| 2015/0324646 A1* | 11/2015 | Kimia | G06T 7/80 |
| | | | 348/62 |
| 2016/0046235 A1* | 2/2016 | Lee | B60Q 5/006 |
| | | | 381/86 |
| 2016/0109954 A1* | 4/2016 | Harris | G06F 3/017 |
| | | | 345/156 |
| 2016/0306431 A1* | 10/2016 | Stafford | G02B 27/0172 |
| 2016/0350334 A1* | 12/2016 | Bataller | G06K 9/6228 |

\* cited by examiner

Palm of Hand

| # | \multicolumn{4}{c}{MOTIONS} | | | | | |
|---|---|---|---|---|---|---|---|---|
| | \multicolumn{4}{c}{LEFT HAND} | | \multicolumn{4}{c}{RIGHT HAND} | | | |
| | ID | Trigger Event | Programmed Function | EMUL ID | ID | Trigger Event | Programmed Function | EMUL ID |
| 1 | TS | Thumb Motion | Thumb Motion | 0001 | TS | Thumb Motion | Thumb Motion | 0001 |
| 2 | WS | Stretching Shrinking | Wrist Movement | 0001 | WS | Stretching Shrinking | Wrist Move | 0001 |
| 3 | FGS | Stretching Shrinking | Index Finger volume up | 0001 | FGS | Stretching Shrinking | Index Finger throttle up/down | 0001 |
| 4 | FSS | Stretching Shrinking | Middle Finger Volume down | 0001 | FSS | Stretching Shrinking | Middle Finger | 0001 |
| 5 | FRS | Stretching Shrinking | Ring Finger | 0001 | FRS | Stretching Shrinking | Ring Finger | 0001 |
| 6 | FPS | Stretching Shrinking | Pinky Movement | 0001 | FPS | Stretching Shrinking | Pinky Apply Brake | 0001 |
| 6 | FIA | FIA-PA | Pinky Curl Mute | 0001 | FIA | FIA-PA | Pinky Curl Full brake | 0001 |
| 7 | FIA | FIA-PA | Ring Finger | 0001 | FIA | FIA-PA | Ring Finger | 0001 |
| 8 | FIA | FIA-PA | Middle Finger | 0001 | FIA | FIA-PA | Middle Finger | 0001 |
| 10 | FIA | FIA-PA | Index Finger | 0001 | FIA | FIA-PA | Index Finger | 0001 |

TABLE 2

Fig. 14

ENIGMA SYSTEM

CLAIM TO PRIORITY

This application is a continuation of application Ser. No. 15/470,861 filed on 27 Mar. 2017 which is a continuation in part to application Ser. No. 14/740,220 filed 15 Jun. 2015 which is a continuation in part to Ser. No. 13/652,424 filed 15 Oct. 2012 (now U.S. Pat. No. 9,060,385) and application Ser. No. 12/106,323 filed 20 Apr. 2008 (U.S. Pat. No. 8,290,636) which claims priority to provisional application 60/912,940, filed on 20 Apr. 20, 2007, and is further a continuation in part to application Ser. No. 13/114,028, filed on 23 May 2011, which claims priority to provisional application 61/347,423, filed on 23 May 2010, whereas the entire contents of all such references are hereby incorporated herein by this reference for all that they disclose for all purposes.

TECHNICAL FIELD OF THE INVENTION

The present invention is an electronic enigma system comprising wearable universal control (WUC), a hearable, and an electronic device associated with a data source. The electronic enigma system can monitor the user's environment and, by user command or automatically, provide selectable information about the user's environment allowing a user to better "decoded" his environment as well as provide notifications/warnings and program the system to control items identified in the user's environment. The system can also detect an electronic item in the user's environment, download a control information and use a glove or gloveless controller to control the electronic device.

BACKGROUND OF THE INVENTION

The field of wearable technology and electronic devices relate to clothing and accessories incorporating computing and other advanced electronic technologies. Such wearable electronic devices are becoming more and more popular. For example, recently a swarm of smart watches are coming to market. Consequently, wearable technology can provide ever-present computing features that interweave technology into the everyday life providing a plurality of functions.

As a typical person goes through his daily routine, he encounters a multitude of items, electronic-based and otherwise, substances and environmental situations that may need to be evaluated. Additionally, it is not uncommon to encounter numerous people, known and unknown, perhaps from a plurality of backgrounds and associated languages and cultures. Information about your environment and items and people in your environment may prove very useful. What is needed is wearable technology that can be used to monitor a user's environment, identify items, situations, and/or people of interest and then access a database of information to locate data about the item of interest and present such data to a user.

For example, there is a need for a system that is wearable by a user during his everyday routine where the user can identify an item of interest in his environment and where the system will use an image of the item of interest to search a database and access information about the item of interest. If the item is an electronic device that is controllable (toy, TV, computer, door lock, network server, etc.) the system would identify the device and access associated information (e.g. how to control, access and use the device). If the item of interest is a sign written in a secondary language (relative to a primary language), the system translates such language and conveys the meaning of the sign to user. Similarly, a user could manually select an item as an item of interest, such as a drone vehicle, and the system would take an image of the drone's product label, access and download the drone's control program to the system's universal controller so that the user's universal controller would then be programmed to control the drone vehicle.

Embodiments of the present invention address such functions.

SUMMARY

Some of the objects and advantages of the invention will now be set forth in the following description, while other objects and advantages of the invention may be obvious from the description or may be learned through practice of the invention.

Broadly speaking, a principle object of the present invention is to provide an enigma system configured to monitor, identify and inform a user of items in the user's environment.

Yet another object of the present invention is to provide an enigma system comprising a universal wearable wireless controller in communication with data source and a hearable where a user identifies an item in his environment (or the item is automatically selected by the system) using hand or finger movements and accesses a data source to retrieve information about the item where at least part of such information is transferred to the hearable.

Still another object of the present invention is to provide a wireless controller system comprising an imaging component configured to detect hand movements/gestures and associate a control signal with such hand movements/gestures and perform a predefined function.

Yet another object of the present invention is to provide a universal controller that can be programmed for communication with and/or control of a plurality of suitably configured electronic device without the need for hardware and software changes.

Yet another principle object of the present invention is to provide a wearable universal wireless controller that is associated with a user's body and further in communication with an imaging system configured to detect and decode hand and/or finger movements to generate event data that is used to control remote devices.

Another general object of the present invention is to provide a universal wearable wireless controller that provides a docking station configured for mechanically receiving and electrically associating with an electronic communication device such a cellular phone where the cellular phone is used to transmit controller signals to remote devices.

Another object of the present invention is to provide a universal wearable wireless controller configured to receive personality-modules that define a primary purpose of the controller.

Yet another object of the invention is to provide a universal wearable wireless controller that can control a plurality of device via visual interpretation of hand movements, wrist movements, finger movements, and voice wherein said controller has a plurality of communication elements that may be used to transmit control signals to a remote device.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 14 is a continuation of the table presented in FIG. 13;

Figure 1:
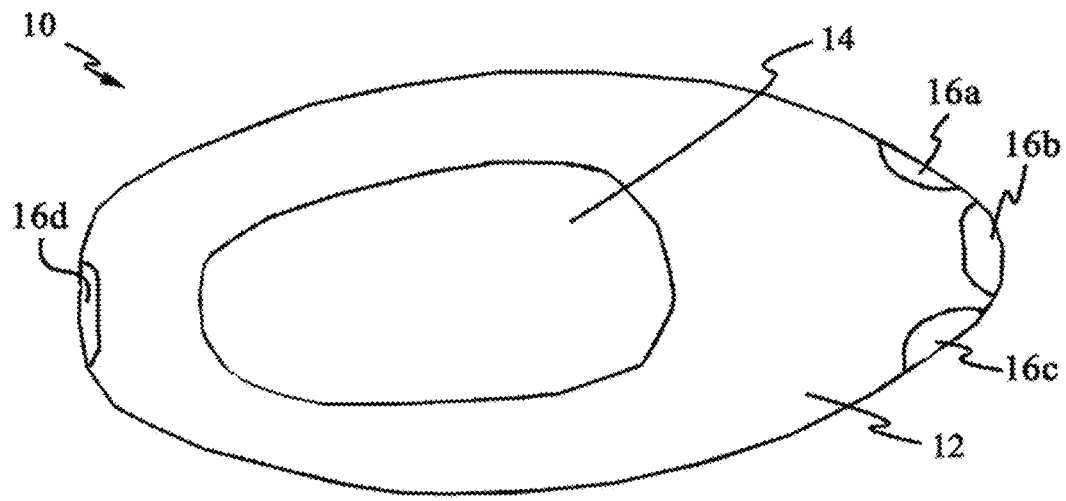
FIG. 1 is a top view of one exemplary embodiment of a water board showing an access point and lighting features.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description.

Repeat use of reference characters is intended to represent same or analogous features, elements or steps. It is to be understood by one of ordinary skill in the art that the present discussion is a description of exemplary embodiments only and is not intended as limiting the broader aspects of the present invention.

Construction Aids

For the purposes of this document two or more items are "mechanically associated" by bringing them together or into relationship with each other in any number of ways including a direct or indirect physical "releasable connections" (snaps, screws, Velcro®, bolts, etc.—generally connections designed to be easily and frequently released and reconnected), "hard-connections" (welds, rivets, macular bonds, generally connections that one does not anticipate disconnecting very often if at all and that are "broken" to separate), and/or "moveable connections" (rotating, pivoting, oscillating, etc.).

Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

The term "universal" used with wireless controller means such wireless controller, using a plurality of communication circuits, is configured to control a plurality of devices without the need for reprogramming or hardware changes. Notably such universal controller may be reprogrammed if desired to add and remove devices from the controller programming. Downloading information used by a "universal" controller is called "reconfiguring" not reprogramming.

For the purposes of this document, unless otherwise stated, the phrase "at least one of A, B, and C" means there is at least one of A, or at least one of B, or at least one of C or any combination thereof (not one of A, and one of B, and one of C).

As used herein, the terms "first," "second," and "third" may be used interchangeably to distinguish one component from another and are not intended to signify location or importance of the individual components. The term "axial" refers to a direction parallel to the direction of rotation of an object; the term "radial" refers to a direction extending away from the center of an object or normal to the "axial" direction, and the term "circumferential" refers to a direction extending around the circumference or perimeter of an object.

As used herein, the terms "first," "second," and "third" may be used interchangeably to distinguish one component from another and are not intended to signify location or importance of the individual components. The term "axial" refers to a direction parallel to the direction of rotation of an object; the term "radial" refers to a direction extending away from the center of an object or normal to the "axial" direction, and the term "circumferential" refers to a direction extending around the circumference or perimeter of an object.

This document includes headers that are used for place markers only. Such headers are not meant to affect the construction of this document, do not in any way related to the meaning of this document nor should such headers be used for such purposes.

While the particulars of the present invention and associated technology may be adapted for use with any type of device with electronic systems (model vehicles such as drones, cars, planes, powered land device, powered water devices), the examples discussed herein are primarily in the context of powered devices to be used while standing.

DESCRIPTION

Referring now to FIG. 1 is a top view of a surfboard (10) showing an access point, covered by access hatch (14), and lighting features according to one exemplary embodiment of the invention. For the presently preferred embodiment of the invention surfboard (10) is the general size and shape of a traditional surfboard. Surfboard (10) comprises access hatch (14) for covering an access point configured to allow access to interior components. Such access hatch (14) does not necessarily form a water tight seal. Toward the front of surfboard (10) are light modules 16a, 16b, 16c and 16d (referred to collectively as 16). It should be appreciated that the location, size and shape of such light modules is for illustration purposes only and may be of any shape and size and positioned in other locations and that additional light modules may be added without departing from the scope and spirit of the invention.

For the present embodiment of the invention, the light modules (16) are low voltage; low power consumption modules that include a self-contained replaceable battery. One suitable light technology includes light emitting diodes (LED). Such light modules are releasably associated with surfboard (10). For the preferred embodiment such light modules are electrically associated with a controller associated with a user. Such a configuration allows remote activation of the light modules as defined later in this document. Alternatively, such light modules may simply comprise a switching device that is actuated to turn the light module on/off. One possible switch type is a magnetic switch such as a reed switch or Weigand wire that is actuated using a magnetic element. Such a switch enhances the ability to waterproof the module. For the presently preferred embodiment, such light modules comprise wireless communication circuitry configured for communication with a controller. For one embodiment, such communication capabilities include a receiver configured to receive control signals (such as a turn on/off signal) from the controller. For such an alternative embodiment, communication capabilities include a transmitter for transmitting data to a remote device such as the controller. Such transmitted data may include, for example, battery status information. Suitable communication technologies include Bluetooth and ZigBee.

The light modules (16) may further comprise a local activation mechanism for enabling and disabling the lighting modules. For such a configuration, the light modules (16) may be disabled to prevent unnecessary power drain by the receiver. Suitable activation mechanisms include a magnetic sensor such as a reed switch, Hall Effect device, Weygand wire, or other suitable magnetic device.

Preferably, the light modules (16) are fully self-contained in a substantially water proof, shock resistant light housing. Such light housing is configured for being mechanically associated with surfboard (10). In addition, for one embodiment, at least one light module may be disassociated from the surf board (10) and carried and used as traditional flash light.

Figure 2:
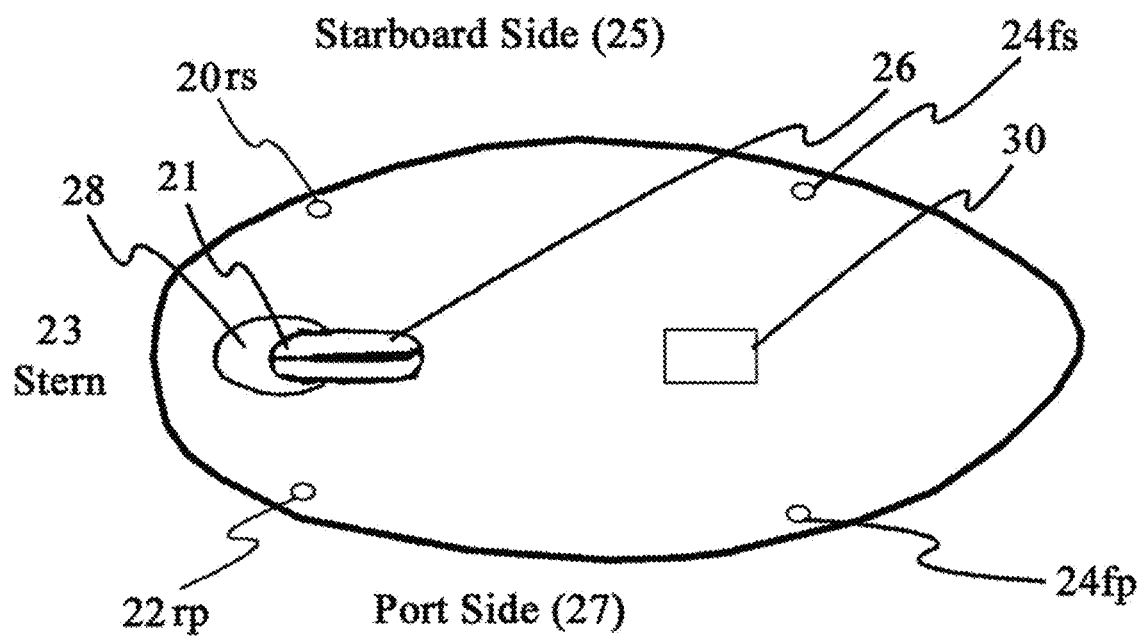
FIG. 2 is a bottom view of one exemplary embodiment of a water board showing output ports, intake, a deterrent system output ports, and a control rudder.

Referring now to FIG. 2, a bottom view of the exemplary embodiment of the present invention depicted in FIG. 1 is presented. The surfboard (10) comprises output port (20rs) (rs=rear, starboard), (22rp) and (28). It should be appreciated that any number of ports may be used, including only one port, without departing from the scope and spirit of the invention. The function of such ports will be described in more detail below.

Figure 4:
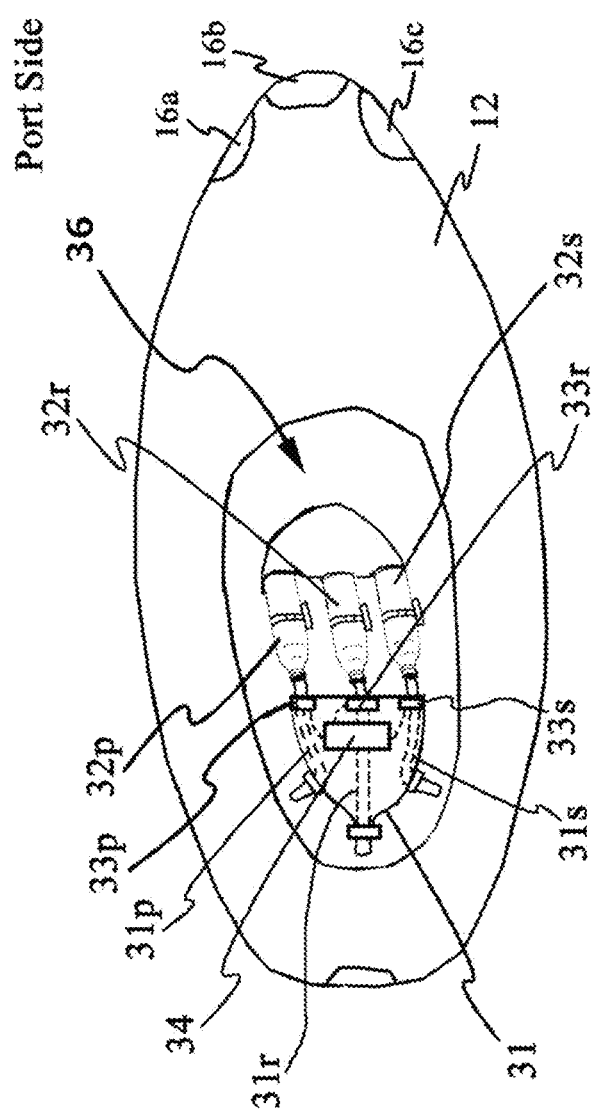
FIG. 4 is a top view of one exemplary embodiment of a water board with an access point hatch removed revealing a propulsion manifold mechanically associated with a substance-source further electrically associated with a controller.

Surfboard (10) further comprises control rudder (26). The control rudder (26) is of conventional design. For one alternative embodiment, the control rudder (26) is movably associated with surfboard (10) so that the control rudder (26) may be rotated in respect to the bottom of surfboard (10). For such an alternative embodiment, the control rudder (26) is mechanically associated with a control motor configured for rotating control rudder (26) so that the distal end (21) points toward the stern (23), the starboard (25) direction, or the port (27) direction. The control motor is electrically associated with, and is in electrical communication with, an apparatus controller (34) (FIG. 4). As will be described later, the apparatus controller (34) is in electrical communication with a remote module associated with a user. When the "apparatus" being controller is a surfboard, apparatus controller (34) could be viewed as a surfboard controller.

Surfboard (10) further comprises port (30), port (24fs) (fs=front, starboard) and port (24fp). For one embodiment, such ports provide an output port for a deterrent system. Such deterrent system will be described in more detail later. For yet another alternative embodiment of the invention, any one of ports (30), (24fp) and (24fs) may be configured to provide exhaust ports for a propulsion or booster system described later.

Figure 3:
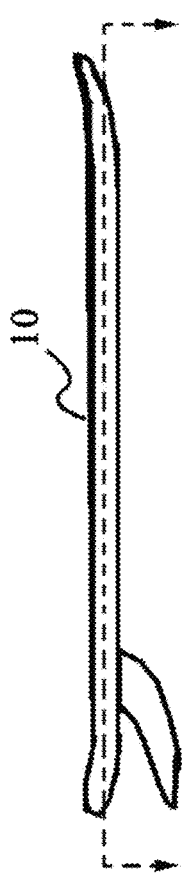
FIG. 3 is a side view of one exemplary embodiment of the water board presented in FIG. 1 and FIG. 2.

FIG. 3 is a side view of the exemplary embodiment of surfboard (10) presented in FIG. 1 and FIG. 2. As depicted in FIG. 1, FIG. 2 and FIG. 3, it should be appreciated that for the presently preferred embodiment of the invention, the physical dimensions of board (10) (length, width, and height) are similar to traditional prior art surf boards.

Referring now to FIG. 4, a top view of the exemplary embodiment of the invention depicted in FIG. 1 with access hatch (14) removed thereby revealing an internal void (36) defined by the surfboard structure (12). Disposed within the internal void (36) is a propulsion manifold (31) mechanically associated with substance-source (32r, rear), (32p, port), and (32s, starboard) via thrust-valves (33r), (33p), and (33s) respectively. The output side of thrust-valve (33r) is mechanically associated with output port (28) via manifold path (31r). The output side of thrust-valve (33p) is mechanically associated with output port (22rp) via manifold path (31p). The output side of thrust-valve (33s) is mechanically associated with output port (20rs) via manifold path (31s).

For the presently preferred embodiment, thrust-valves (33) are flow control components electrically associated with controller (34). Such flow control components comprise an input and an output separated by an electrically controlled valve component. The valve component is configured for receiving control signals from controller (34) and changing its open/closed state based on such control signals. Such control signals may simply be a power signal supplied to a valve component or, alternatively, a signal received by an onboard valve controller depending on the valve configuration.

As one of ordinary skill in the art will appreciate, a powered riding apparatus user may use a control module associated with the user's hand to generate signals that are wirelessly transmitted to and received by controller (34) which in turn generates thrust-valve control signals that cause the associated thrust-valves to manipulate the acceleration generated by a propulsion system.

For one alternative embodiment, controller (34) is configured with an accelerometer configured to generate acceleration data that is used by controller (34) to automatically limit the acceleration of the power riding apparatus to a predefined value. Ideally, for powered riding apparatuses where a user stands on such apparatus (such as a surfboard), acceleration of the powered riding apparatus would be limited to 1.0 G (G is the value for acceleration due to gravity). For such configuration, the user may simply generate and transmit a simple on/off signal to controller (34) which may be configured to automatically limit (and/or maintain as much as possible) acceleration to a predefined value such as 0.7 G. Alternatively, controller (34) may simply automatically limit maximum acceleration to a maximum value but allow the user to manipulate acceleration below such maximum value. For example, if controller (34) is preprogrammed for a maximum acceleration of 1 G, a user may be allowed to generate control signals to manipulate the acceleration of the powered riding apparatus between 0.0 Gs and 1.0 G.

Exemplarily embodiments of electronic thrust-valves (33) include a magnetic latching valve, a motor driven valve, and electrically controlled solenoid valve. Thrust-valves (33) may be electronically controlled: (i) close and prevent a substance within substance-source (32) from exiting the substance container, (ii) open and allow a substance within substance-source (32) to exit the substance container and flow into propulsion manifold (31) and out an output port, and (iii) open and allow a substance to be injected into substance-source (32) thereby replenishing/recharging substance-source (32). The electrical association between thrust-valves (33) and controller (34) may be a wired or wireless communication and/or power connection.

For one alternative embodiment, thrust-valve (33) may be a one-way valve. For such configuration, thrust-valves (33) comprise a check-valve to prevent reverse flow. Substance-sources (32) are recharged by either replacing substance-sources (32) or removing substance-sources (32) from surfboard (10), recharging/replenishing substance-sources (32), and reinstalling substance-sources (32). Alternatively, the mechanical connection between substance-sources (32) and propulsion manifold (31) may be removed and a recharging/replenishing device mechanically associated with substance-sources (32) allowing substance-source (32) to be recharged/replenished without removing substance-source (32) from surfboard (10).

It should be appreciated that substance-source (32) comprises a container for holding a substance that can be expelled at relatively high speeds to create thrust. One suitable embodiment of a substance-source (32) comprises a container configured for storing a gas under high pressure. For example, substance-source (32) may be a tank or module for housing compressed gases such as air or $CO_2$. Additionally, while the preferred embodiment comprises an independent substance-source (32) for each flow path, alternative embodiments using only one substance-source (32) connected to multiple flow paths fall within the scope and spirit of the present invention.

Further, the propulsion system that generates thrust may be powered by an internal combustion engine or an electrical motor without departing from the scope and spirit of the event. For such configuration, the "thrust control components" are simply the components that control the thrust generated by the propulsion system. For the internal combustion engine configurations, the thrust control components would include a typical throttle-controller in electrical communication with controller (34). Similarly, for electric motor configurations, the thrust control components would simply be a power-controller that manipulates the voltage and/or current supplied to the electrical motor where such power-controller is in electrical communication with controller (34). It will be appreciated that "electrical communication" may be achieved using wired or wireless technology.

Motorized Land Board

Figure 5:
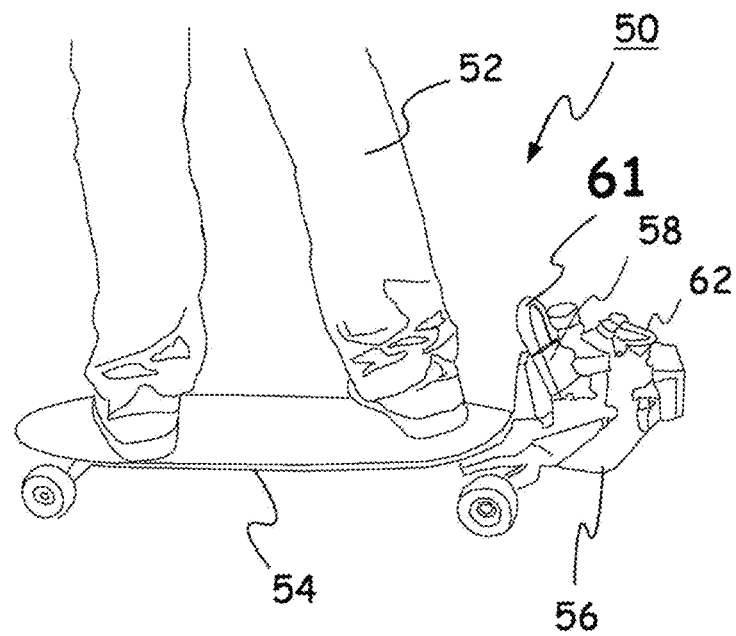
FIG. 5 is a side perspective view of one exemplary embodiment of a user riding one exemplary embodiment of a powered riding apparatus.

Referring now to FIG. 5, a side elevated perspective view (50) of a user (52) on one exemplary motorized land apparatus (i.e. a land board here) (54) is presented. It should be appreciated a "motorized land apparatus" may be any powered device configured to be ridden on land such as skates of all types, skateboards, longboards (essentially a surfboard on wheels), and off-road "all terrain" boards. For the currently preferred embodiment, motorized land board (54) is a skateboard associated with a liquid fuel powered motor (56) mechanically and/or electrically associated with machine control module (58). It should be appreciated that machine control module (58) is a type of apparatus controller (34). Notably, the propulsion system of the motorized land board (54) may be a liquid fuel (such as gasoline) based engine, a solid fuel-based engine, and an electric motor without departing from the scope of the current invention. It should be noted that for this document, a gas powered "motor" and a gas powered "engine" refers to the same device (i.e. "motor" and "engine" are the same).

Figure 5B:
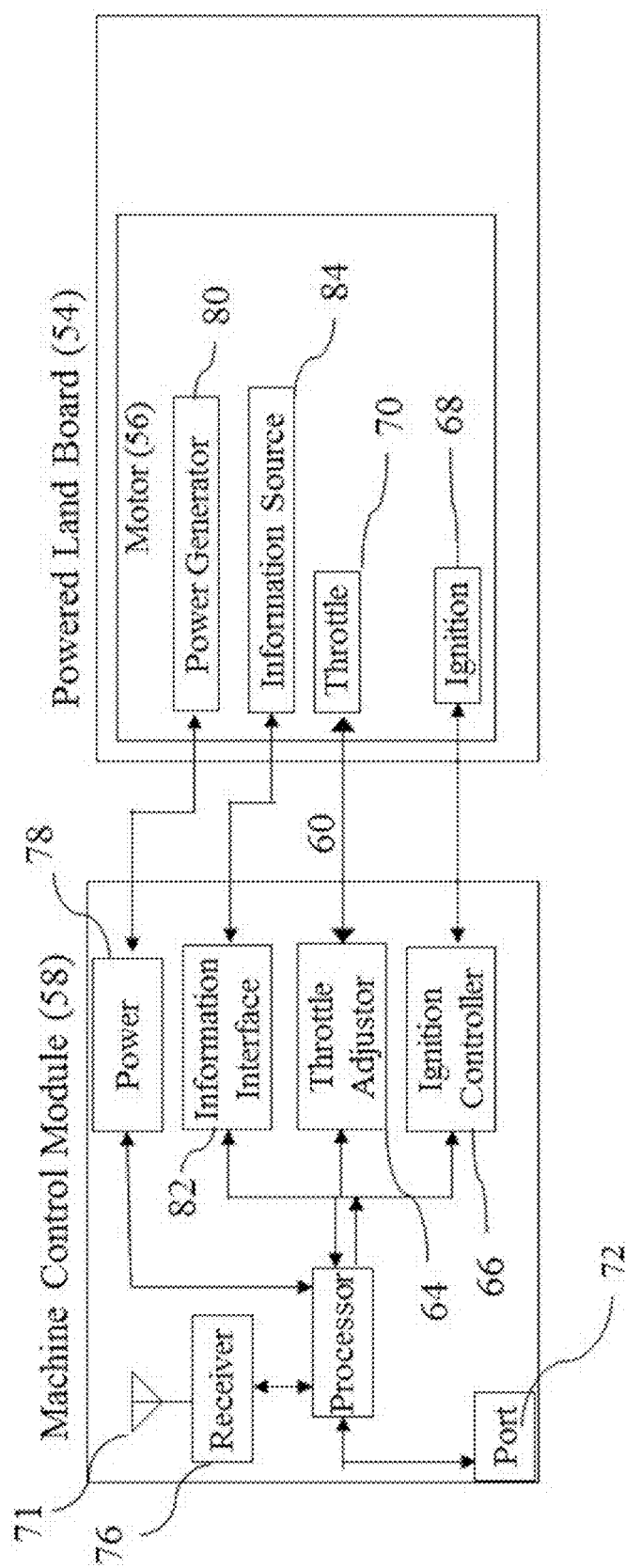
FIG. 5b is a block diagram representation of one exemplary motorized land board with an electronic control module.

Referring now to FIGS. 5 and 5b, for the current embodiment, the throttle control system (70) for the fuel powered motor (56) is mechanically associated via a cable and/or linkage (60) with a throttle adjustor (64). Any suitable technology may be used as a throttle adjustor including (a) electrical servos that provide feedback to the control module (58) or, alternatively, (b) a simple motorized device configured to open and close the throttle (70). Such throttle adjustor (64) devices are preferably at least partially disposed inside of machine control module (58). Additionally, machine control module (58) may comprise an ignition controller (66) configured to control any of the motorized land boards (54) ignition components (66) such as the stator, coil, or electronic ignition. For one alternative embodiment, ignition controller (66) comprises a CDI ignition system (Capacitor Discharge Ignition that may be programmable and dynamically and remotely controlled) that controls the spark generated by the system and transferred to plug (62). CDI ignition systems are well known in the art and a detailed description thereof is not necessary for providing an enabling disclosure of the invention. Machine Control module (58) comprises at least one of an external antenna and an internal antenna (71). For one embodiment, handle (61) comprises an antenna electrically associated with a transmitter or receiver (76) disposed in machine control module (58). The specifics of the machine control module (58) will be discussed in more detail below.

The Machine Control Module may further contain a power source (78) which may be a self-contained power source (i.e. no power connections to external power sources) or may be further configured for being connected to a power generator (80) associated with motor (56) or an external charger such as a photovoltaic device.

Information Interface (82) is configured for being associated at least one external information source such as information source (82) associated with powered land board (54). For the embodiment depicted in FIG. 5b, such information source (82) may be one or more of: (a) a temperature sensor configured for generating sensor signals representative of a temperature including the motor temperature and ambient air temperature, (b) a RPM sensor configured for generating sensor signals representative of the motors RPMs, (c) a fuel sensor configured for generating sensor signals representative of the amount of fuel remaining in a fuel source, (d) a power quality sensor configured for generating sensor signals representative of output power levels of power generator (80), (e) motion sensors such as a speed sensor configured for generating sensor signals representative of the speed of the motorized land board (54) and orientation sensors such as acceleration and gyroscopes such as MEMS gyroscopes.

As noted above, one information source (82) may be an accelerometer configured to transmit acceleration data. For such configuration, control module (58) may be further configured to limit acceleration as described previously using at least one of throttle adjustor (64) and ignition controller (66).

Port (72) may be configured for any number of uses including programming the processor or updating firmware or interfacing the processor with an external controller associated with a user. Port (72) may use inductive communication, wireless communication, and wired communication technologies. Such communication technologies are well known in the art.

For four wheeled land vehicles, motorized land board (54) may use air filled, liquid filled, and/or solid filled tires. For road boards, the motorized land board is about 4 feet to 6 feet long with the motor disposed at the rear of the board as depicted in FIG. 5. The output of the motor is linked to the rear axle connecting the rear tires with a chain and sprocket. One alternative embodiment is to position the motor, so the output of the motor turns a shaft that connected at least one rear tire. For electric based motors, electric motors may be associated with one or more wheels with the power pack preferably disposed on the underside of the board between the from and back wheels.

For yet another alternative embodiment, land board (54) may or may not contain a motor for generating acceleration. For example, Land board (54) may be simply a board that is used to coast down hills (for example). For such configuration, control module (58) may simply be a device for activating an electronic braking mechanism to help slow down land board (54). The electronic brake would be associated with at least one of the wheels or axles of land board (54) where the activation circuit electrically associated with either the ignition controller or a throttle adjustor is stead configured to activate the electronic brake.

Wireless Glove Interface

Generally speaking, a wireless glove interface presented within this document is an electronic apparatus configured for converting a user motion to an electronic signal that is transmitted to a remote electronic device such as controller (34). Such user motion can be 1 dimensional, 2 dimensional, or 3 dimensional and may be generated by a finger, hand, arm movement (or any combination thereof). An example of a 1-dimensional movement is a "thumbs up". An exemplary 2-dimensional movement is a repeated thumbs up, thumbs down movement. An exemplary 3-dimensional movement is a repeated thumbs up, thumbs down movement while moving the hand left and right. The "wireless glove" controller means there is no wires connecting the controller to the device being controlled.

An exemplary gloveless wireless controller is a wireless controller comprising no glove or similar component but configured with an imaging system configured to detect motions (such as finger, hand, and arm movements) and associate such motions with a function such as transmitting a control signal.

It should be appreciated that such a wireless glove interface can be used to communicate with any number of electronic modules/electronic devices depending on its configuration and/or programming. Thus, the wireless glove interface is defined as a universal wireless controller. Such controller may comprise a plurality of wired and wireless technologies including any combination of WiFi, Bluetooth, ZigBee, Cellular, light based (infrared) communication transmitter/receivers. As will be presented below, embodiments of such universal wireless controller can be programmed so that the wireless signal it transmits can be used by a remote "controller" device to perform a plurality of functions including keyboard, mouse, and apparatus movements and actions. Initially, the wireless controller application will be configured as a controller for a powered riding apparatus.

Figure 6:
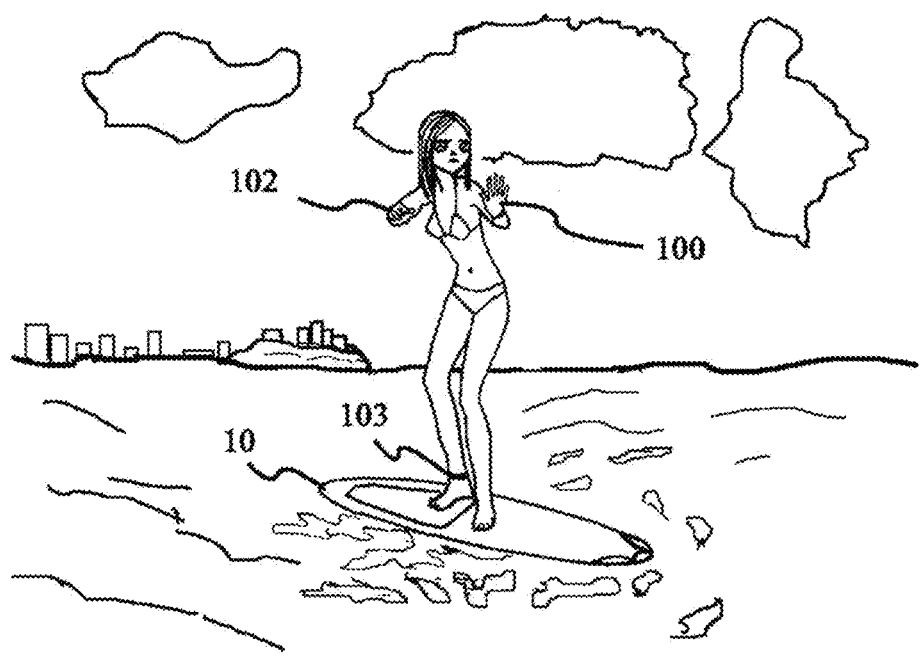
FIG. 6 is a top perspective view of one exemplary embodiment of a user standing on a water board where the user is associated with a wireless controller incorporated into a user module.

Referring now to FIG. 6, a side perspective view of a surfboard according to one exemplary embodiment of the invention is presented with a user standing on the surfboard (10) where the user is associated with a user interface (100). For the presently preferred embodiment, user interface (100) comprises a glove structure associated with an electronic module (112, FIG. 7). A second user interface (102) may be associated with the other user's hand. Additionally, the user may be further associated with an ankle strap (103). Such user interfaces and ankle strap devices are configured with wireless technology for remotely controlling surfboard (10) features.

For example, ankle strap (103) may be configured with wireless technology that is in communication with controller (34). The ankle strap (103) transmits a low powered transponder signal that is received by controller (34). Controller (34) may be configured to perform a variety of functions depending on whether the transponder signal is present. For example, should a user wearing ankle strap (103) fall from surfboard (10), the transponder signal would be lost and controller (10) would deactivate/activate a surfboard feature.

Figure 7:
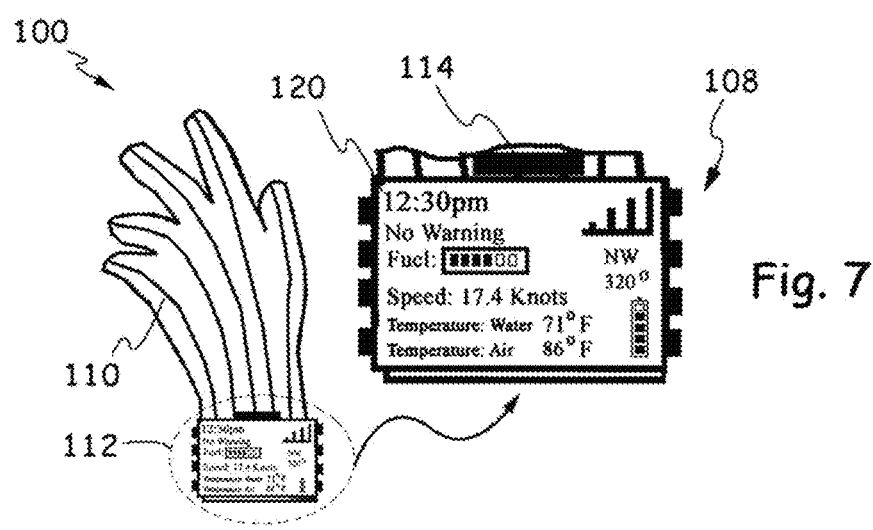
FIG. 7 is a top view of one exemplary embodiment of a wireless controller incorporated into a user module including one exemplary display format.

Referring now to FIG. 7, one exemplary embodiment of a user interface (100) is presented. User interface (100) comprises a glove structure associated with a user module (112). User module (112) comprises wireless communication technology for sending and receiving data signals. User module (112) further comprises a user display (104) for displaying information to a user. User display (104) is configured to allow any desired user orientation relative to the glove. For example, user display (104) may be rotated so that display (104) has the same orientation as a typical watch and such orientation may change when the user moves interface (100).

For one preferred embodiment, the power source is a long-life lithium battery capable of powering user module (112) for at least ten years. For such an embodiment, user module (112) is completely encapsulated in a potting material to prevent moisture from entering the module thereby making user module (112) a "throw away" device should the module malfunction or when the power source is depleted. The potting material that covers display (104) would be a transparent potting material. Alternatively, at least part of the face of display (104) may be configured to charge the modules power source using photovoltaic technology. Alternatively, user module (112) may be configured with an interface for inductively charging the module's power source. Such technology allows user module (112) to be completely sealed using a potting material as described above while extending the useful life power source.

The electronic features of user module (112) are described in more detailer later in this document. It should be appreciated that user interface (100) embodiments that do not include a glove structure fall within the scope of the disclosed inventions. For example, user interface (100) may be a simple handheld controller with push buttons where the handheld controller is in wireless communication with controller (34) as well as other devices. Other embodiments include the user interface (100b) configuration depicted in FIG. 15 which is described in more detail later.

One exemplary configuration for presenting the various data to a user via display (104) is presented in FIG. 7. Such data includes time data, warning data, fuel level data, battery status data, speed data, temperature data, signal strength data, and direction data. Preferably, such display configuration is user programmable allowing the user to select the data that is to be displayed. The time data may be a current time read out or an elapsed time read out (stop watch) for other time data. The warning data may be any warning that the user module (112) is configured to generated or receive from an external device. Fuel Level data presents information relating to the substance used by the propulsion system of the apparatus in communication with user module (112). Battery Status data is displayed to inform the user of the status of the power source powering user module (112). Speed data is data related to the movement of surfboard (10) (i.e. the apparatus in communication with the user module). Temperature data is data related to the temperature of various objects such as water temperature and air temperature. Signal strength data is data describing the relative strength of a received signal for a remote transmitter whether associated with surfboard (10) or some other device. Direction data provides a user with an indication of the direction the user module (112) is pointing. Preferably, user module (112) may be configured to continuously update the direction data or only update upon receiving a user request (to save battery life). Similarly, user module (112) may be user configurable to update the displayed information as desired by a user. It will also be appreciated by one of ordinary skill in the art that user interfaces (100) comprising electronic modules without displays fall within the scope and spirit of the present invention.

User module (112) further comprises user input points (108) and (124). For the preferred embodiment, user inputs (108) are buttons located on one or more sides of user module (112). Such user buttons allow a user to change information displayed by user display (104) as well as set selected user configurable parameters. User input (114) is a user programmable button that may be configured to perform one or more specific tasks whenever user input (114) is activated. For the preferred embodiment, user input (114) is configured as a "panic button" that sends a distress signal and may activate a system such as a deterrent system.

For one embodiment, the user input buttons define magnetic switches that do not physically penetrate the housing for user module (112). For such configurations, a magnetic element is positioned/disposed within the input button so that when the input button is pushed toward user module (112) the magnetic flux lines impinging a magnetic detection element within the user module (112) housing varies thereby signaling activation. Such a configuration enhances the waterproofing capabilities of user module (112).

User interface (100) is one possible device that may be used for controlling the booster system of surf board (10) or a machine control module (58) associated with a motorized land board (54) as described above or just about any electronic device. For the preferred embodiment, as a user closes her hand, a parameter of one or more control lines (110) changes. For example, the resistive value of control lines (110) changes as control lines (110) are stretched when a user makes a fist. Such changes are sensed by user module (120) and the appropriate booster system control signals are sent to controller (34). Controller (34) generates the necessary control signals to activated one or more thrust-valves (33).

Alternatively, the glove structure may be configured with a control-component that is configured to generate a control signal that is conveyed to user module (112). One exemplary embodiment of a control-component is a plunger switch that generates a control signal based on how far the plunger is pressed. Such a control signal may simply be a resistance value.

Wireless Glove with Magnetic Interface

Figure 7B:
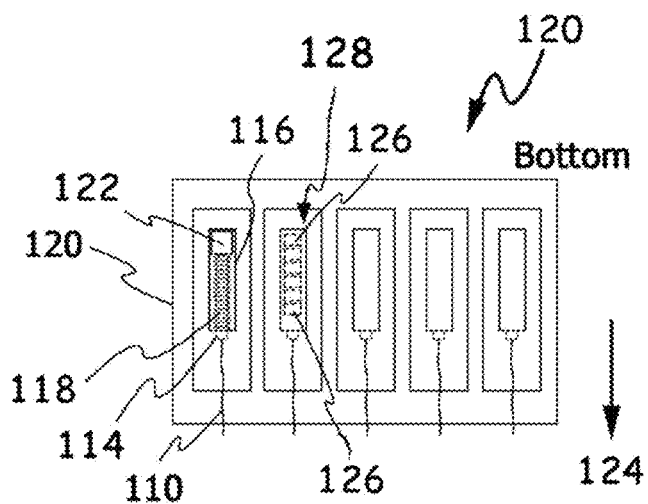
FIG. 7b is a bottom view of the controller of FIG. 7 depicting control lines and a method of coupling control signals generated by a user's hand to said controller.
Figure 7C:
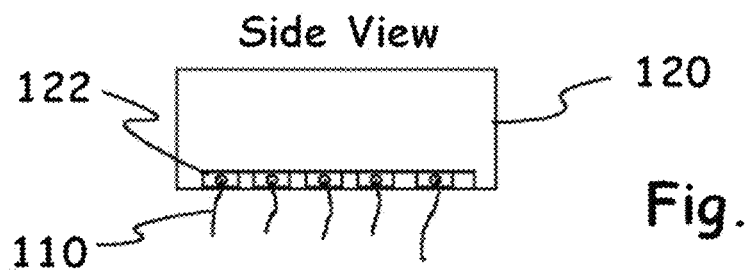
FIG. 7c is a side view of the controller of FIG. 7b.

Referring now to FIG. 7b and FIG. 7c, a bottom view (200) of one exemplary embodiment of user interface (100) as noted above and depicted. For such embodiment, user interface (100) comprises user module (112). As noted above, preferably, user module (112) is completely encapsulated in a potting material to prevent moisture from entering the module thereby making user module (112) a "throw away" device if the system is not configured with a recharging feature and when the power source is depleted. Alternatively, the power source for module (112) may be inductively charged requiring no direct electrical connections. The potting material that covers display (104) (if any) would be a transparent potting material.

A method of transferring user control signal from a user to interface (100) is now considered. As depicted in FIG. 7, user interface (100) is associated with a glove device configured for generating control signals used use by module (112) to generate the control signals that are transferred to thrust generator (206) or machine control module (58) to selectively activate the thrust generator or to control the throttle of a power land board as previously described.

Referring now to FIGS. 7b and 7c, for one embodiment, module (120) connected control lines (110) may be strings/cables/wires that pull on and move magnetic devices (122) associated with module (120). Such movements are sensed by user module (112) and the appropriate control signals are transmitted to a remote module such as controller (34) which would receive such control signals and generate the necessary control signals to activated one or more thrust-valves (33) (for the surfboard) or the throttle-controller of a powered land board.

For the configuration depicted in FIGS. 7b and 7c, control lines (110) are mechanically associated with a first end of shaft (114). A magnetic device (122) is mechanically associated with a second end of shaft (114). Shaft (114) and magnetic device (122) are disposed in housing (116). Housing (116) is disposed adjacent to and outside of user module (112).

It should be appreciated that there are many variations on such design that fall within the scope of the present invention and this disclosure. For example, housing (116) may be an integral component of user module (112). Alternatively, the various housing (116) may be removably associated with user module (112). The goal is to bring magnetic device (122) in close proximity to a surface of user module (112) so that magnetic signals can be interact with detection circuits within user module (112). One of ordinary skill in the art will appreciate that such a configuration allows a user to generate control signal (by making a fist, for example) wherein such control signals are inductively or conductively or magnetically transferred to user module (112) without providing a path that a liquid (such as water) to penetrate.

A resilient component (118) is associated with shaft (114) that biases the shaft in a default position. As shown in FIG. 7b, the resilient component (118) is a spring disposed around shaft (114) and between magnetic device (122) and an opposing wall of housing (116). As control line (110) is pulled in direction 124, magnetic device (122) moves toward the opposing end of housing (116) thereby compressing resilient component (118). As the pulling force on control line (110) is removed, resilient component (118) moves magnetic device (122) back toward the default position.

Within user module (112) a magnetic sensor (126) is disposed in a location that will be adjacent to each magnetic device (122) so that sensor (126) may receive magnetic information from magnetic device (122). For the embodiment depicted in FIG. 7b, sensor (126) comprises a series of aligned magnetic sensors. As magnetic device (122) moves toward the opposing wall of housing (116) as described above, a first magnetic sensor will receive less information from magnetic component (122) while a second magnetic sensor will receive more information from magnetic component (122). The controller uses such information to perform a predefined action.

As used here, "information" is simply magnetic flux lines. For example, suppose magnetic component (122) is a permanent magnet and a series of magnetic sensors (126) are disposed in user module (112) in a location that places such series of magnetic sensors in alignment with the path of movement of magnetic component (122). The series of magnetic sensor (126) in FIG. 7b comprises six sensors in alignment along slot (128). As magnetic component (122) moves along the slot (128), such movement caused by a user making a first and thereby pulling on string 110 which pulls on shaft (114), a different magnetic sensor in the series of magnetic sensors is activated. When the magnetic component is in position 6, magnetic sensor 6 is activated. User module (112) detects that sensor 6 has been activate and generates the corresponding control signal. For this example, such a control signal may be a "full throttle" signal. As the user opens his fists, resilient component (118) pulls magnetic sensor (122) back to the "home" position.

Alternative embodiments for the embodiment depicted in FIG. 7b monitor an electrical parameter of the control lines (110) or associated with such control lines and such control lines may be directly electrically associated with circuits within user module (112). For example, as a user closes her hand, an electrical parameter of one or more control lines (110) changes. For one embodiment, control lines (110) form an electrical circuit associated with user module (112). Module (112) applies a voltage to control lines (110) and measures the resulting current. When the control lines are stretched by closing the hand and making a fist, the resistive value of control lines (110) changes and such changes are detected by module (112) and module (112) generates the appropriate control signals to be transmitted to a remote device.

It should be further appreciated that other means of generating control signals may be used in place of such glove configuration. For example, a simple push button device may be electrically associated with module (112) for generating such control signals. Additionally, such the "glove features" may be replaced by just the control lines that extend to fingertip caps or that are configured for being placed over or inside a glove.

Controller and User Interface

Attention will now be directed more specifically to exemplary embodiments of the controller (34) (associated with an apparatus to be controlled) and user interface (100) configurations. It should be noted that user interface (100) sends control signals to controller (34), and thus, "controls" controller (34). Consequently, user interface (100) could also be labeled a "controller". In an attempt to minimize confusion, this document endeavors to refer to user interface (100) as simply the "user interface" or the "wireless glove controller" depending on the configuration being considered whereas controller (34) may be generically referred to as the "apparatus controller". For example, a toy vehicle may have an onboard controller that receives signals and converts such signals into a movement. Such onboard controller is the "apparatus controller" (34) and the user interface (100) is one embodiment of a controller associated with an apparatus user.

Figure 8:
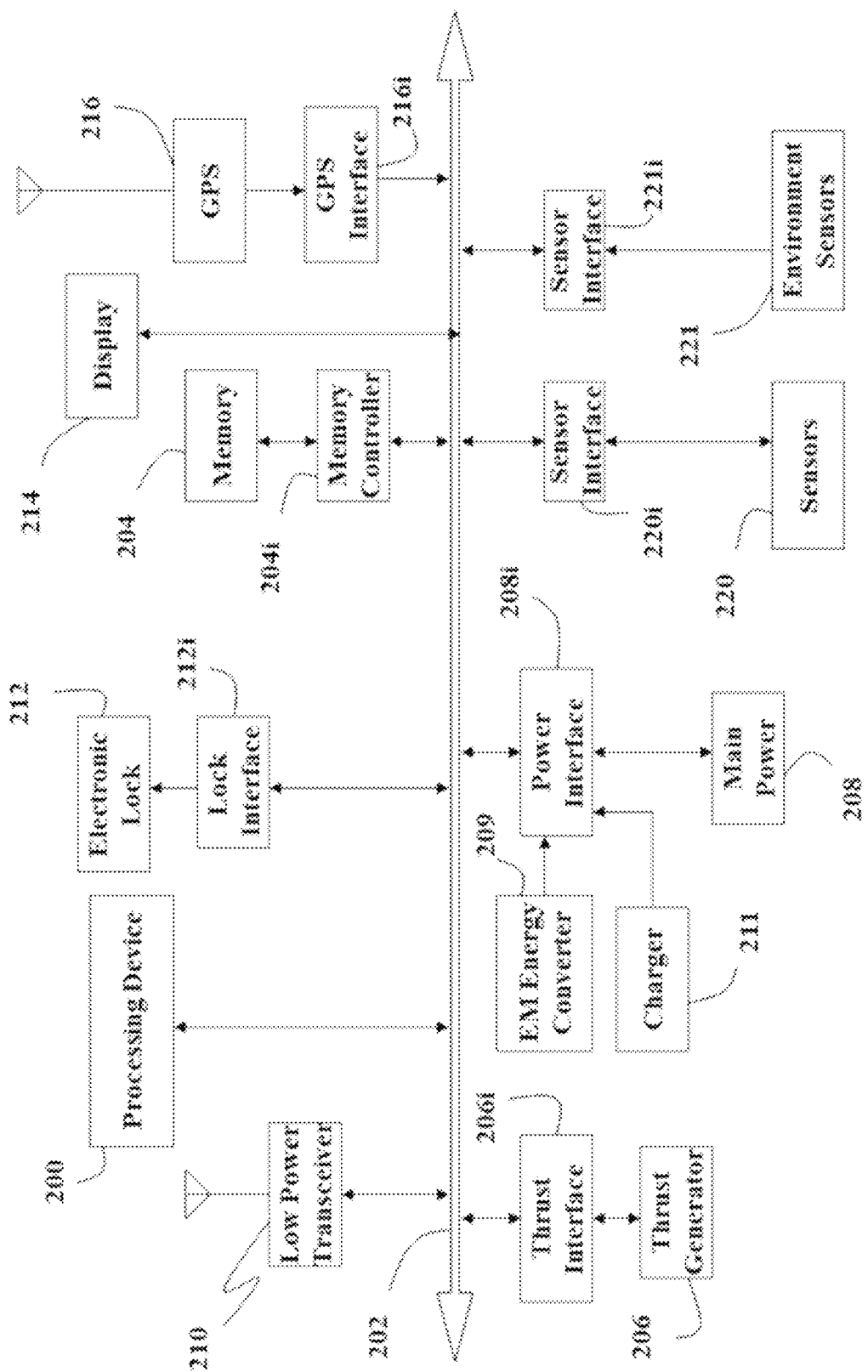
FIG. 8 is a block diagram representation of one exemplary controller configuration.
Figure 9:
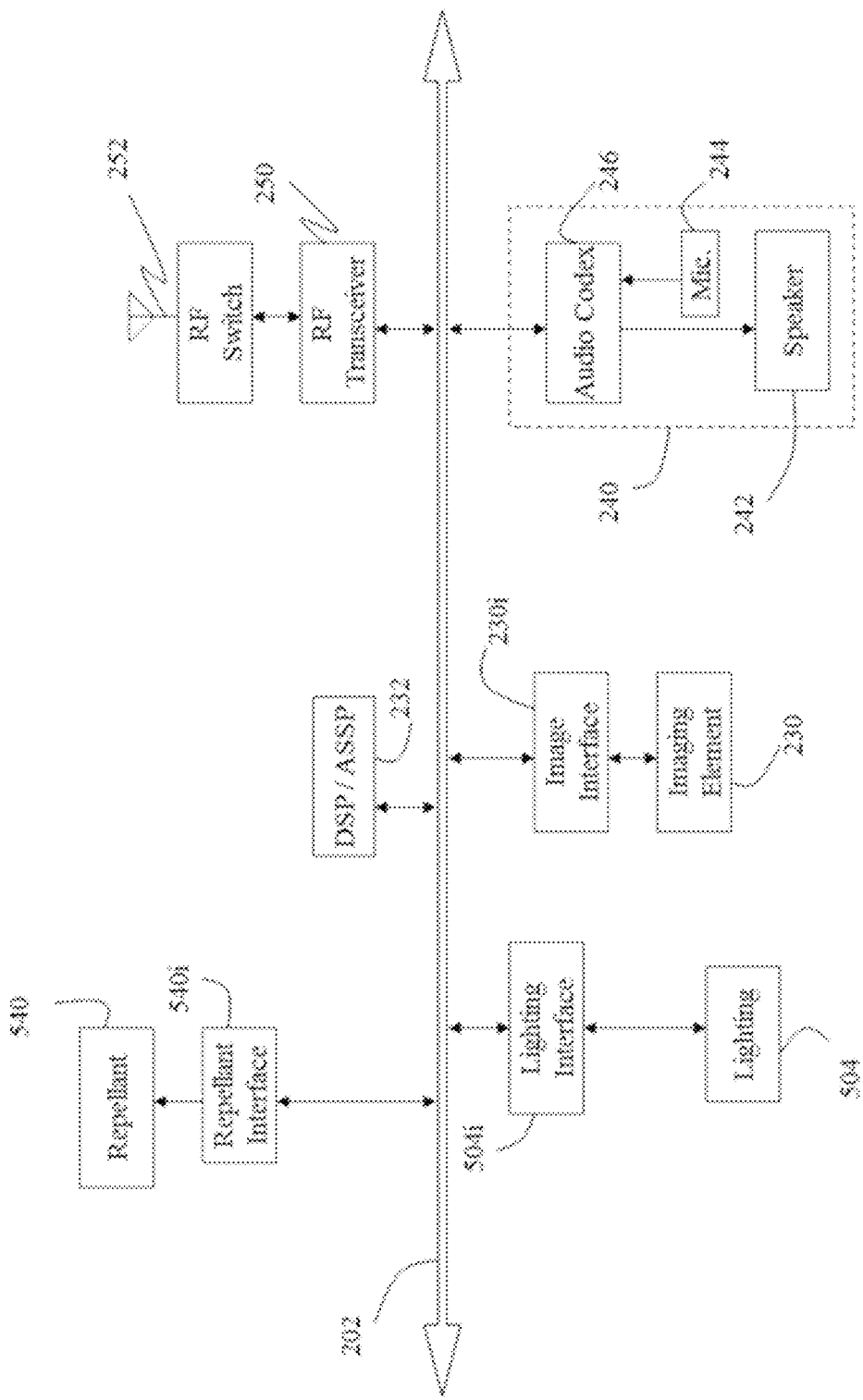
FIG. 9 is a continuation of the block diagram representation of FIG. 8.

Referring now to FIG. 8 and FIG. 9, a block diagram representation of the various electronic components of controller (34) is presented. It should be appreciated that user interface (100) may use the same or substantially similar components. After the components of controller (34) are described, exemplary embodiments of user interface (100) are considered.

Initially it should be appreciated that FIG. 8 presents just one of a plurality of methods of electrically associating the various electronic components to achieve the features desired. For example, FIG. 8 presents the use of a common buss (202) for electrically associating the various components. It should be appreciated that embodiments where certain devices are electrically associated with each other without the use of a buss fall within the scope of the invention. In addition, various embodiments of controller (34) may include all the features presented in FIG. 8 or only a subset of subset of such features.

Further, many of the components and the associated configurations and connections represent general-purpose devices that are well known in the art. Applicant's novel features include at least one of the device specific programming, thrust interface controllers, and environmental sensor combinations, as well as the various universal glove control features including using a plurality of signal generating technologies in a novel way.

Controller

The first "controller" configuration considered is associated with the previous described surfboard (10). For the presently preferred embodiment, controller (34) comprises either an electronic module integral to surfboard (10) or mechanically associated with surfboard (10) (although such controller could be associated with any powered riding apparatus with thrust/acceleration control mechanisms). For such exemplary embodiments, controller (34) is preferably completely encapsulated in a potting material to prevent water contamination. Additionally, any wired connections between controller (34) and external devices are preferably achieved using a non-wicking wiring system. It should be further appreciated that many of the electronic components for controller (34) are similarly suitable for user interface (100).

The functional blocks of FIG. 8 represent components well known in the art such as ASSPs (Application Specific Standard Product), Complex Programmable Logic Devices (CPLD), ASICs (application specific integrated circuit), microprocessors, or PICs. In addition, one or more functional blocks may be integrated into a single device or chip sets such as ASSP chip sets. For example, one or more of the various interfaces described below may be integrated into (or have its described functions performed by) processing device (200). Such devices are well known in the art.

There are many manufactures of suitable ASSP devices including Motorola, and Texas Instruments. While most of the functions are preferably performed by ASSP chip sets, Complex Programmable Logic Devices (CPLD) may be used to interface the various ASSP blocks to system buss (202) allowing one system component to interface with another component. Manufactures of suitable CPLD devices include Lattice's (ispMACH 4000 family) and (Altera's MAX 7000-series CPLD).

For the presently preferred embodiment of the invention, processing device (200) is configured for controlling the various systems of surfboard (10) including the data management system, communication system, power management system, deterrent system, propulsion system, lighting system, environmental and user sensor systems, imaging/sound system, anti-theft system, and entertainment system. Processing device (200) may be a simple PIC (such as the ones manufactured by MicroChip) or a relatively more complicated processor configured for use with standard operating systems and application software. Other technologies that may be used include ASICs (application specific integrated circuit) and ASSPs (application specific standard product). Processing device (200) may comprise onboard FLASH, ROM, RAM, EPROM type memories. Such devices and their electrical connections/associations are well known in the art.

Processing device (200) is electrically associated with buss (202). Buss (202) is a typical prior art communication bus configured for providing a communication path between the various electronic devices electrically associated with buss (202). For example, Buss (202) is configured for transferring data signals between processing device (200) and other electronic devices electrically associated with buss (202). For the preferred embodiment, buss (202) also comprises electrical paths for transferring power between main power (208), EM energy converter (209), charger (211) and other electronic devices electrically associated with buss (202). Buss (202) may further comprise a data port and or a power port configured for supplying/receiving power or providing a communication path to electronic devices electrically associated with such port.

Memory (204) is electrically associated with buss (202) via memory controller (204*i*). Memory (204) may be any type of memory suitable for storing data such as flash memory, SRAM memory, hard drive memory, as well as other types of memories. Volatile memory continuously connected to a power source may be used as a non-preferred method of achieving a nonvolatile memory function, and thus, can be considered a type of nonvolatile memory. For the preferred embodiment, memory (204) is nonvolatile memory. Memory (204) may be used for storing all types of data including application programs, image data, sound data, customer information, sensor data, and warning-criteria. Memory (204) is electrically associated with processing device (200) via memory controller (204*i*) and buss (202).

DSP/ASSP (232, FIG. 8) is electrically associated to processing device (200) via buss (202). DSP (232) is configured to perform signal processing tasks such as voice, audio, video, encoding, decoding as well as other data and signal processing functions. DSP/ASSP technologies are well known in the art and a detailed description thereof is not necessary to provide an enabling description of the present invention.

Display (214) is configured for displaying the various system data received or generated by controller (34). Display (214) is electrically associated with buss (202) and may include technology for providing a customizable touch screen controller configured for control and decoding functions for display (214). For the preferred embodiment display (214) is an LCD display. Additionally, for one embodiment, display (214) comprises a "memory" configured to provide an image when power is removed from the display. For this embodiment, an image is written on the LCD display and when power is removed, the display will retain the image virtually indefinitely. Such an LCD display uses a technique developed by Zenithal Bistable Devices (ZBD), which adds a finely ridged grating to the inner glass surface of an LCD cell of Super-Twist-Nematic (STN) construction. As is known in the art the presence of the grating "latches" the polarization state of the liquid crystals and retains it when power is removed. Preferably, hatch (14) comprises display-section that is at least partially transparent to allow viewing of display (214) without removing the hatch. Alternatively, controller (34) may be disposed within (i.e. housed by) hatch (14).

Controller (34) may further comprise a graphics accelerator that provides support for megapixel cameras and 3D graphics applications. One suitable graphics accelerator is the MQ2100 manufactured by MediaQ. For such a configuration, an imaging device (described later) associated with board (10) or the board user may be used to record images that are stored in memory (204) and displayed on display (214) upon user request. Much of the above technology is similar to that found in cellular telephones and thus is known in the art.

The more novel features of a controller (34) include its association with thrust generator (206) electrically associated with processing device (200) through thrust interface (206i). For the presently preferred embodiment, thrust generator (206) comprises propulsion manifold (31), substance-source (32), and thrust-valves (33). Processing device (200) is configured to receive propulsion control signals from user interface (100). Upon receiving such propulsion control signals, processing device (200) generates the corresponding control signals that are transferred to thrust interface (206i) which selectively activates the appropriate thrust-valves to generate the desired thrust. Alternatively, the signals received from user interface (100) may be directly routed to thrust interface (206i).

As noted above, an accelerometer may be electrically associated with processing device (200) or thrust interface (206i) to generate acceleration data which would be used to control acceleration. For one alternative embodiment, environmental sensors (221) include an accelerometer. The accelerometer generates acceleration data that is transferred to processing device (200) (depending on the configuration) which is configured to generate control signals to manipulate the appropriate thrust-valves so that a maximum predefined acceleration threshold is not exceeded. Further, processing device (200) may be programmed to maintain, as best as possible, a predefined acceleration. For powered riding apparatuses where a user stands on such power riding apparatus (like a surfboard and land board) such acceleration limit value is preferably between 0.5-Gs and 1.0-Gs with an acceleration limit threshold of 0.6 Gs-0.8 Gs. It will be appreciated that "G" refers to 9.8 Newtons per kilogram (N/kg) . . . (i.e. a unit of force equal to the force exerted by gravity).

Exemplary communication circuitry is now considered. It should be appreciated that the user interface may comprise a plurality of transmitters and associated technology to generate and communicate with a plurality of devices. For one embodiment, relatively long-range wireless communication circuitry includes RF transceiver (250) electrically associated with antenna (252). RF Transceiver (250) is configured to transmit and receive data signals to/from a remote electronic device. It should be noted that embodiments where such communication circuitry comprises only a transmitter or only a receiver fall within the scope of the invention. For one embodiment, transceiver (250) comprises a relatively low power transmitter that transmits a data signal in an unlicensed frequency band. Other embodiments include a relatively longer-range transmitter comprising any number of well-known technologies for wireless communications transmitting at any legal power level. For example, transceiver (250) may be configured to communicate over GPRS, GSM, GPRS, 3G, and EDGE enabled networks as well as WAP networks.

To facilitate remote access to controller (34), a networking system, such as a local area network (LAN) or a wide area network (WAN) may be utilized. In this presently preferred embodiment, processing device (200) and memory (204) are configured to form a TCP/IP protocol suite and an HTTP (HyperText Transfer Protocol) server to provide two-way access to the surfboard (10) data. Such TCP/IP protocols and HTTP server technology are well known in the art. For such an embodiment, user controller (34) include an HTTP server and a TCP/IP protocol stack. Further, controller (34) would be configured to receive wireless communication signal such as those typically transmitted over a cellular network.

Generally speaking, a gateway may simply be a means for connecting two already compatible systems. Alternatively, a gateway may be a means for connecting two otherwise incompatible computer systems. For such an alternative configuration, the TCP/IP protocol suite may be incorporated into a gateway serving multiple controller (34) devices via a wired or wireless two-way network using, for example, Wireless Fidelity (Wi-Fi) technology. Such a gateway may incorporate an HTTP server for accessing data from multiple controller (34) devices and for transmission of data to individual user interface (10) devices. Gateway technology is well known in the art.

In the above described TCP/IP enabled controller (34) system, a remote transceiver provides access to a first network operating in accordance with a predetermined protocol (TCP/IP is one example). A plurality of controller (34) devices may comprise a second network, such as a LAN. A gateway operatively couples the first network to the second network. Finally, an HTTP server is embedded in either the gateway or the plurality of user interface (100) devices facilitating the transfer of data between the two networks. With such a configuration, one of ordinary skill in the art will appreciate that individual controller (34) device or groups of controller (34) devices may be accessed as if the controller (34) devices were a web site and their information could be displayed on a web browser.

One of ordinary skill in the art will further appreciate that such a configuration enables continuous remote access to the controller (34) so that one or more powered riding apparatuses (for example, a fleet of drones) may be remotely controlled from anywhere in the world using a wide area network (such as the Internet). Preferably, the powered riding apparatus or an associated item is configured to provide live video feed. Notably, a user associated with a universal wireless glove controller apparatus as defined herein would effectively be wirelessly tethered to controller (34) via a computer anywhere in the world allowing such user to control the powered riding apparatus with hand movements/gestures while watching the apparatus on a computer display screen. Such system preferably uses a WAN to monitor the powered riding apparatus (or simply a powered apparatus that is a drone) and RF communication technology (such as cellular phones or other wireless technology) to issue control signals. Such a configuration allows a user associated with a user interface (100) type controller such as the disclosed wireless "glove" controller, to remotely control (from anywhere in the world with access to a WAN) any appropriately configured electronic device/system including lighting systems, vehicles, security systems, cameras/video systems, sound systems, and computers. An appropriately configured device would be associated with a controller with all or a subset of electronics features described for controller (34).

Controller (34) may further be configured for storing and/or generating location data. For embodiments that generate location data, controller (34) includes a position-finder such as GPS device (216) electrically associated with processing device (200) via buss (202) and GSP Interface (216i). GPS (216) is one embodiment of a position-finder electrically associated with a processing device where GPS (216) is configured to generate position-data for the location of controller (34). Alternative embodiments include controller (34) configurations that do not include a GPS but instead received location data from an external device such as user interface (100).

The attributes of exemplary main power (208) are now considered. For the presently preferred embodiment, main power (208) is a long life depletable power source such as a Li Ion battery. For such embodiment, main power (208) comprises at least one long life rechargeable Li Ion battery such as the ones manufactured by A123 Systems®. Alternative embodiments include rechargeable batteries that may be recharged through a direct or inductive connection.

Extending the life of main power (208) or extending the time between recharging is one design concern addressed by power interface (208*i*) such as the ones found in prior art cellular phones. Power Interface (208*i*) is configured to perform power management functions for the system as well as monitor the status of main power (208) and report such status to devices electrically associated with buss (202) (such as processing device (200), user interface (100), etc.). Power interface (208*i*) dynamically addresses power management issues by selectively powering down unutilized devices. For the Preferred embodiment, power interface (208*i*) is a CPLD that generates chip-select signals and powers down the various ASSPs as desired. Alternatively, processing device (200) may perform such power management functions.

Imaging element (230) is electrically associated with processing device (200) through image interface (230*i*) and buss (202). Imaging element (230) and image interface (230*i*) are configured for acquiring and transferring images to electronic devices electrically associated with buss (202). For the preferred embodiment, imaging interface (230*i*) is configured to support CMOS image input sensors such as the one manufactured by Micron® and/or CCD (charge-coupled device) image input sensors such as the ones manufactured by ATMEL® sensors. Imaging interface (230*i*) performs the necessary processing functions to convert the imaging data into a desired format before transferring such data to other devices associated with buss (202). Surfboard (10) may be configured with an imaging element (230) for recording surfing activities (as well as other activities). Such image data is formatted and stored in memory (204) for later use. As will be explained below, the imaging element (230) may further be configured to detect user movements which are evaluated by a processing device to determine if such user movements define a user command. If so, an associated command signal is generated to perform a predefine function (power on signal, faster, slower, break, select environmental item and search remote database, etc.).

Low Power transceiver (210) would typically comprise a low power transmitter relative to transceiver (250). For the embodiment in FIG. 8, low power transceiver (210) operates in an unlicensed band although frequencies requiring a license may be used. Suitable technologies include Bluetooth and ZigBee (IEEE 802.15). ZigBee is a low data rate solution for multi-month to multi-year battery life applications. ZigBee operates on an unlicensed, international frequency band. Such technologies are known and understood by those skilled in the art, and a detailed explanation thereof is not necessary for purposes of describing the method and system according to the present invention. Low power transceiver (210) is configured for short range communication with other suitably configured devices.

Attention now is directed to audio module (240). For the preferred embodiment, audio module (240) comprises sound transducer (242) and microphone (244) electrically associated with audio codex (246). Audio module (240) is configured for detecting sound waves and converting such waves into digital data of a predefined format such as MP3. Sound waves may also be generated by audio module (240) using sound transducer (232) to issue warnings and provide for other forms of communications. For example, audio module (240) may be used for voice communications between a person located at controller (34)/user interface (100) and a person located at a remote site, using, for example, VoIP for the IP enabled systems describe earlier. Audio module (240) may also be used to play MP3 files stored in memory (204) or via streaming data over a communication connection. Such technology is well known in the art.

EM (electromagnetic) Energy Converter (209) is electrically associated with power interface (208*i*) and mechanically associated with the top of surfboard (10). EM Energy Converter (209) can be describes as an RF to DC converter configured to convert electromagnetic energy (such as a radiated RF signal from a man-made transmitter, sunlight, etc.) into a voltage for supplying power to system components and/or supplying energy to a power source. One well known EM Energy Converter is a photovoltaic cell. Such technologies are well known in the art.

Similarly, a charger (211) may be electrically associated with power interface (208*i*) via a direct connection or via buss (202). Charger (211) is suitably configured for recharging main power 208 as well as providing power to controller (34).

Lighting device (224) are electrically associated with buss (202) via lighting interface (224*i*) and comprises lighting modules 16*a*, 16*b*, 16*c*, and 16*d*. Any number of lighting modules may be used. Preferably, lighting device (224) are configured to be removably associated with board (10) and include their own power source which may or may not be configured for receiving power from main power (208).

Sensors (220) and Environment Sensors (221) may be any number of devices configured to detect any number of parameters related to board (10), a user, and board (10)/user environment and include sonar, accelerometers, thermometers, speed indicators, fuel level indicators, and motion sensors.

User Interface

For one preferred embodiment, user interface (100) is configured using identical or similar technology to the technology described above for controller (34). User interface (100) may comprise devices similar or identical to any of the following (depending on the desired functionality): a processing device (200), main power (208), memory (204), display (104), RF transceiver (250), low power transceiver (210), GPS (216), DSP (232), imaging element (230), audio element (240), EM energy converter (209), and a charger (211) all electrically associated together through a buss such as buss (202) or integrated into one or more chips. Display (104) is preferably an LCD display similar or identical to that described for display (214), although any suitable technology may be used.

It will be appreciated that while some embodiments of user interface (100) may be specifically configured for use with surfboards (10), other embodiments of user interface (100) may be configured to control a variety of powered riding apparatuses configured with electronic controls or power apparatuses in general. Such devices include powered skate boards and other devices with wheels and powered by motors or other types of propulsion systems where a wireless communication connection for transferring control signals from a user to the powered device would be beneficial. For example, where the powered device is a motorized skate board, thrust generator (206) becomes the motor and user interface (100) controls the output power of such motor.

User interface (100) may further comprise a biometric sensor. Such a Biometric sensor is used as a "key" to access controller (34)/user interface (100) functions such as the previously described electronic lock. Biometric identification refers to the automatic identification of a person based on his/her physiological or behavioral characteristics. A biometric system is essentially a pattern recognition system which makes a personal identification by determining the authenticity of a specific physiological or behavioral characteristic possessed by a user. The biometric system may include, for example, a handwriting recognition system, a voice recognition system and fingerprint recognition.

For the preferred embodiment of the invention, the sensor (220) includes a fingerprint scanner. For such embodiment of the invention, a user initially places a finger on biometric sensor (220). The biometric sensor scans the finger and transfers a digital representation of the user's fingerprint to memory (204). Such an initial bio sample is called an enrolment sample. After an enrolment sample has been stored in memory, future user controller (34)/interface (100) actions are authorized by comparing a user's real time fingerprint scan to the enrolment sample.

Universal Wireless Glove

As depicted in FIG. 7, user interface (100) is associated with a glove device configured for converting a user action to a signal detected by module (112) to generate the control signals that are transferred to thrust generator (206) to selectively activate the thrust generator as previously described above. It should be appreciated that other means of generating control signals may be used in place of such glove configuration. For example, a simple push button device may be electrically associated with module (112) for generating such control signals. The "glove" may simply be wires that run along the fingers.

Figure 10:
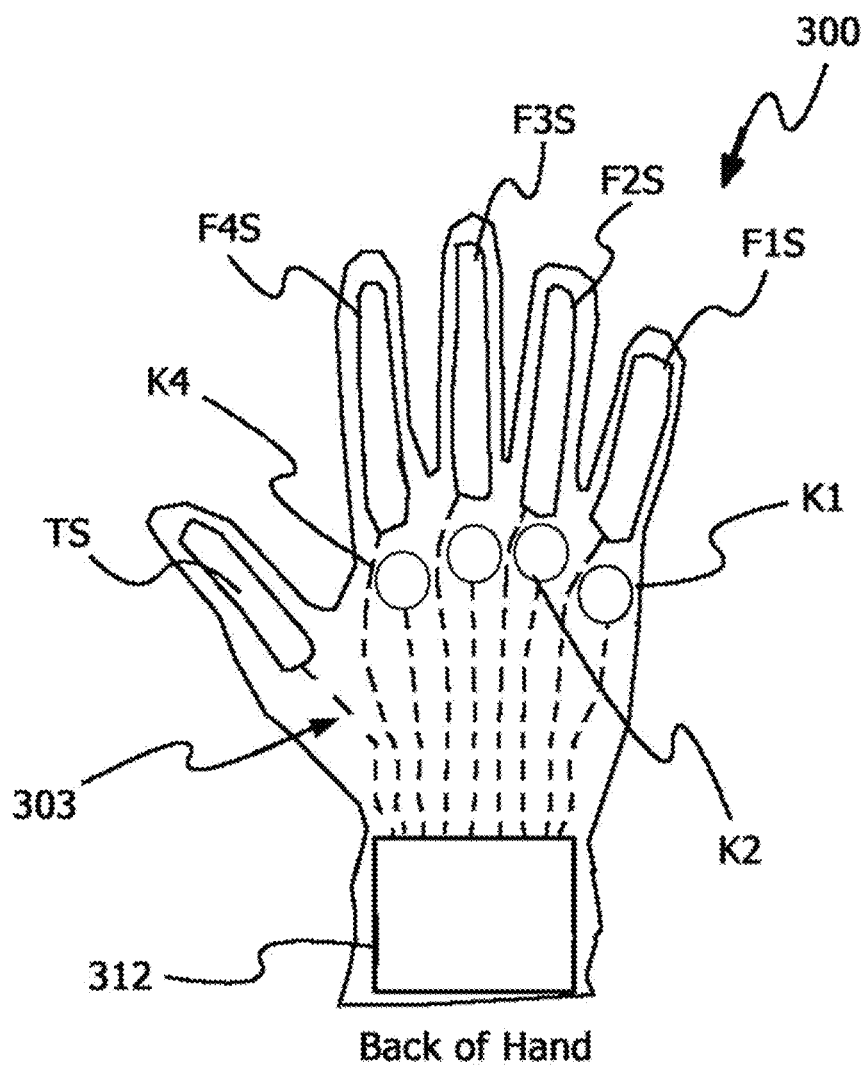
FIG. 10 is a view of the backhand side of one exemplary embodiment of a universal wireless glove controller.
Figure 11:
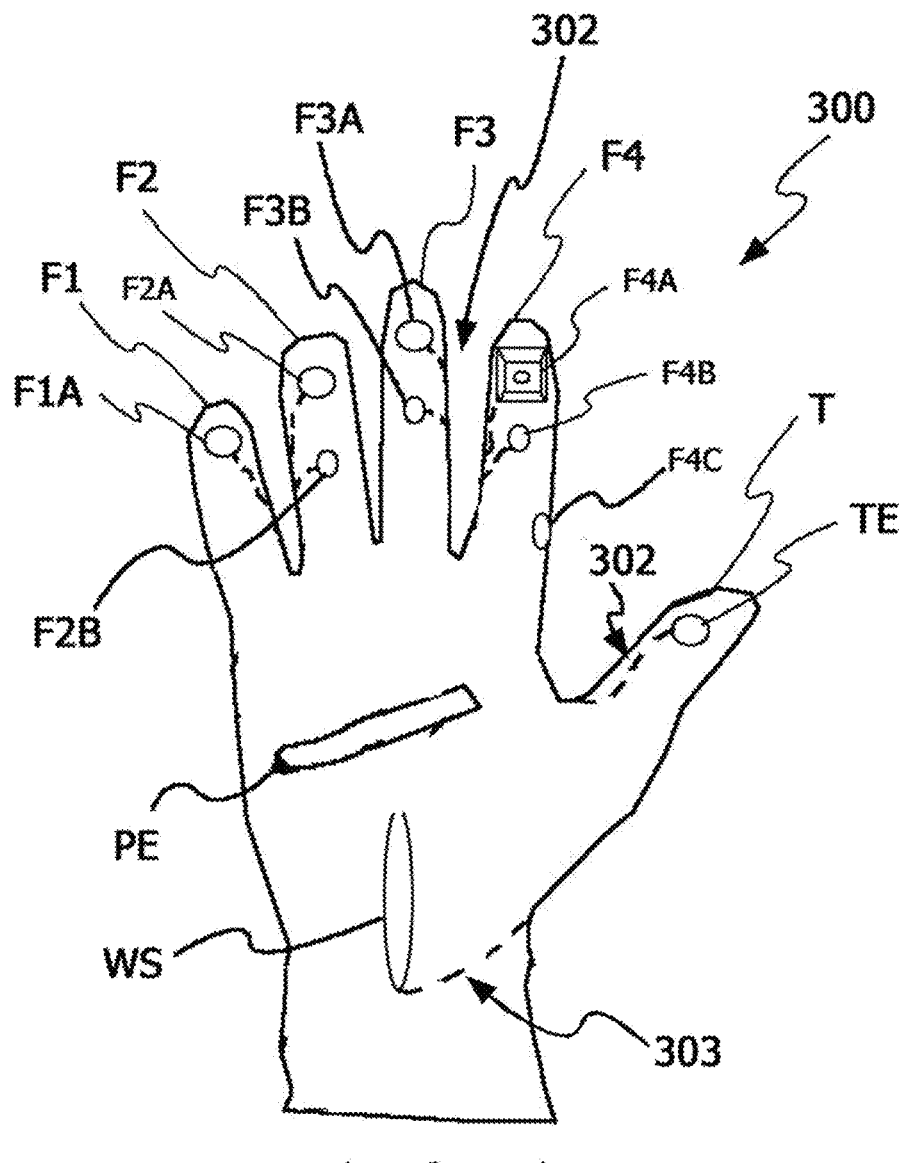
FIG. 11 is a view of the palm side of one exemplary embodiment of a universal wireless glove controller.
Figure 12:
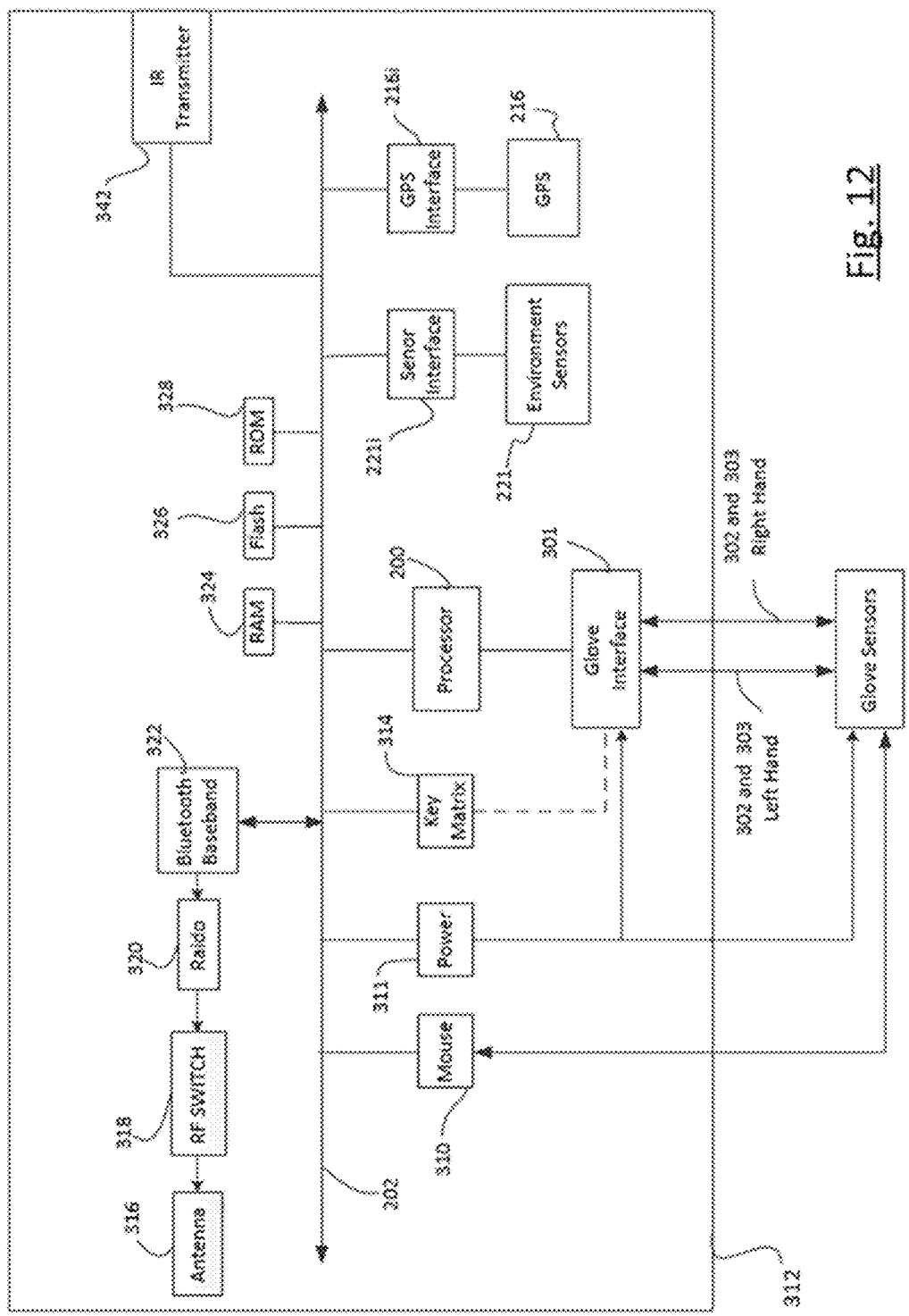
FIG. 12 is a block diagram representation of one exemplary control module for the universal wireless glove controller.

Referring now to FIG. 10, FIG. 11, and FIG. 12, a universal wireless controller comprising a structure configured for being associated with a user's hand, said structure defining a backhand side, a palm side, a plurality of fingers, and a thumb wherein said structure defines the general shape of a human hand. Such controller provides extended features that define a more versatile user interface. At least one finger-element is associated with a finger on the palm side of said structure and at least one stretch-sensor associated a finger on the backhand side of said structure. Additionally, a plurality of knuckle-switches associated with the backhand side of said glove structure wherein said knuckle-switches are electrically associated with said processor. Such knuckle-switches, finger-elements, and stretch-sensors are configured to generate trigger-event-data when activated.

As will be defined in detail below, such trigger-event-data signals are transmitted to a control module comprising a processor electrically associated with a memory and a transmitter. The processor is configured to receive trigger-event-data and use a configuration table (defined later) stored in said memory to be generated a controller-signal for a given trigger-event.

As shown in FIG. 10 and FIG. 11, a Universal Wireless Glove Interface (UWGI) (300) defines a pair of gloves with each glove containing a set of switches and/or sensors electrically associated with electronic module (312). Electronic module (312) may have a similar electrical design to module (112) including a display, however, for the electronic module (312) embodiment considered below there is no display (although there could be). The UWGI (300) glove structure defines a backhand surface (see FIG. 10), a palm surface (see FIG. 11), fingers F1 through F4, and thumb T. While FIG. 10 and FIG. 11 relate to a right-hand glove, it will be further appreciated that a left-hand glove would have substantially similar features and the discussions/disclosures relating to the right-hand glove relate equally to a left-hand glove. Further, the system my only include one glove.

As depicted in FIG. 10, associated with the backhand surface of UWGI (300), in the vicinity of the knuckle area of the glove, is a plurality of knuckle-switches (K1, K2, K3, and K4). For the preferred embodiment, such knuckle-switches (K1, K2, K3, and K4) define mechanical pressure sensitive switches. Alternative embodiments include one or more of such mechanical pressure sensitive switches replaced by electromagnetic sensing technology including reed switches, Hall Effect devices, and Weygand wires. Mechanical pressure sensitive switches are actuated by applying pressure to such switches whereas electromagnetic switches are actuated by bringing a magnetic field within the facility of the switch so that a predefined amount of magnetic field lines are impinging the surface of the electromagnetic sensing technology to signal a change of state for such switch. Notably magnetic fields can be generated by electromagnets or permanent magnets. Miniature Electromagnetic sensing technologies and pressure sensitive devices are well known in the art and a detailed description thereof is not necessary to provide an enabling description of the present invention.

Similarly, associated with the backhand surface of UWGI (300), along the finger areas of the UWG (300), is a plurality of stretch sensors (F1S, F2S, F3S, and F4S). The Stretch Sensor is a component that changes resistance when stretched thereby generating trigger-event-data. When relaxed the sensor material has a first resistance value (such as 1K Ohm) and as the stretch sensor is stretched the resistance gradually increases to a final maximum resistance (such as 10 k Ohm). One suitable stretch sensor is a Bi-Directional Flexible Bend Sensor, model FLX-01-L, manufactured by Images Scientific.

The knuckle-switches (K1, K2, K3, and K4) and stretched sensors (F1S, F2S, F3S, and F4S) are electrically associated with electronic module (312) through data links (303) which may define one or more conductive paths. Such conductive paths may be integrated into the glove (300) structure or run along the outside of the glove (300).

As depicted in FIG. 11, associated with the Palm surface of UWGI (300), is a plurality of finger-elements (F1A, F2A, F2B, F3A, F3B, F4B, F4C). For the current embodiment, finger-element (F4A) is an optical sensor. The thumb, T, is associated with a thumb-element (TE) while the palm is associated with a palm-element (PE) and the wrist is associated with stretch sensor (WS). For the preferred embodiment, both thumb-element (TE) and palm-element (PE) are components that generate a magnetic field and such components are permanent magnets (such as but rare earth magnets). The plurality of finger-elements (F1A, F2A, F2B, F3A, F3B, F4B, and F4C) is electrically associated with electronic module (312) through data links (302) which may define one or more conductive paths. Where thumb-element (TE) and palm-element (PE) are electromagnets, one or more data links (302) provide a power connection to such elements.

Except for finger-element (F4A), the palm finger-elements are preferably electromagnetic switches configured to detect magnetic fields and thumb-element (TE) is a magnetic field generator. Suitable electromagnetic field sensing technology including reed switches, Hall Effect devices, and Weygand wires. For the preferred embodiment, finger-element (F4A) defines a Programmable Linear Hall Effect Sensor ICs with Analog Output such as the one manufactured by Allegro®. Such finger-elements are capable of sensing displacement, and angular position.

Where finger-elements (F1A, F2A, F2B, F3A, F3B, F4B, and F4C) are simple mechanical pressure sensitive switches, they are actuated by applying pressure to such switches thereby generating trigger-event-data. For the embodiments where finger-elements (F1A, F2A, F2B, F3A, F3B, F4B, and F4C) are electromagnetic field sensors and thumb-element (TE) and palm-element (PE) generate a magnetic field, the finger-elements are energized (or activated) by finger and/or thumb motion where the finger-element is brought into close proximity with either the thumb-element (TE) or the palm-element (PE) thereby generating trigger-event-data.

Finger-element (F4A) is preferably a miniature optical mouse sensor associated with an LED (light emitting diode) such as the one manufactured by Agilent. For such configuration, finger-element (F4A) is placed adjacent to a surface and moved along such surface. For one configuration, the optical navigation data is obtained by acquiring sequential surface images at a rate of up to 2300 times per second. Such data is used to mathematically determine the direction and magnitude of movement of the sensor.

Figure 13:
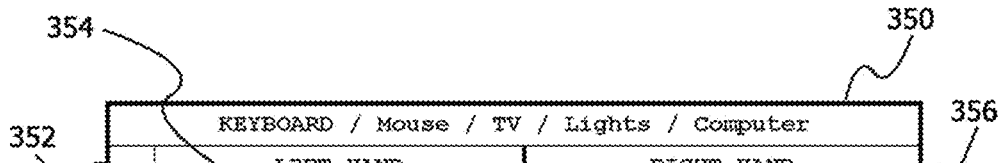
FIG. 13 is a one embodiment of controller-configuration-table for an exemplary electronic device to be controller.

Referring now to FIG. 13 and FIG. 14, exemplary glove tables for defining glove actions are presented. Preferably a plurality of glove tables is stored in a memory within electronic module (312) where each table associates (or maps) the finger movement or switch state with an action to be performed by some electronic device in wireless communication with electronic module (312). While such glove tables could be configured for controlling any type of electronic device, the glove table now being considered relate to keyboard, mouse, hand and finger movement functions for controlling various devices.

Referring to FIGS. 13 and 14, exemplary glove-configuration-tables for configuring one UWGI (300) system to control at least one computing device, video system, Lights, and powered riding apparatus are presented. Such computing devices include a computer, a PDA, and a cellular telephone. Such powered riding apparatus include a powered surfboard and a powered land board. The video systems include televisions and the lighting systems include lights controlled by an electronic module such as the ones typically in security systems.

For one embodiment, the glove-configuration-table contains a trigger event (352) parameter, program function (354) parameter, and an emulation ID (356) parameter. A corresponding signal format table is also stored in memory where such signal format table contains the signal protocol and format information for the devices to be controlled as well as the transmitter technology(ies) to use. Such signal format tables are likely unique for each electronic device and examples are not supplied in this document and are not needed to enable one of ordinary skill in the art to understand and use the invention. For example, where the remote device to be controlled is a television set with an InfraRed (IR) communication feature, the signal format table would contain the appropriated IR signal command parameters. Notably, one of ordinary skill in the art will appreciate that the controller would select the appropriate transmitter technology (e.g. IR transmitter in for IR command signals) from the plurality of transmitter technologies available.

While table (350) contains default values for the emulation ID selected, preferably, electronic module (312) is configured to allow a user to program, and save, and thereby customize parameter values for controlling any type of electronic device associated with a compatible controller such as controller (34) or some other computing device configured to receive transmissions from electronic module (312). Additionally, such programmability allows a user to set up a universal wireless glove (300) as he desires.

For the configuration table (350), UWGI (300) is configured to transmit a control signal and communicate with: (a) a computing device with ID 0001; (b) a television with ID 0020; (c) security system with ID 0100; and (d) a powered apparatus with ID 1000. As will be described later, processor (200) of electronic module (312) uses the ID to look up the communication protocols and signal configurations for the desired command signal so that a properly formatted command signal or communication signal is transmitted to the appropriate remote device using the appropriate transmitter technology(ies).

As noted in line one of table (350), when electronic module (312) determines that knuckle-switch (K1) on the left-hand is actuated, electronic module (312) generates the appropriate control signal associated with such trigger event, activates the appropriate transmitter technology and transmits the control signal. For the table (350) configuration, the IR transmitter is activated, and a signal is transmitted so that the channel on a TV (ID 0020) is incremented by 1 unit. Similarly, when knuckle-switch (K4) on the left-hand is actuated, electronic module (312) generates the appropriate control signal associated with such trigger event, activates the appropriate transmitter technology (e.g. Bluetooth, WiFi, etc.) and transmits the generated control signals that cycle the lights associated with a security system (ID 0100).

Where a trigger event has not been defined, as indicated in line 6 of Table 350, for the preferred embodiment, such trigger event is transmitted to the appropriate device and such device determines the meaning (if any) of such trigger event. Further, for some devices, UWGI (300) simply transmits the trigger event ID and the remote device determines the meaning of such trigger event.

For example, as depicted in line 7, when a user wishes to type the character "A", the user moves his thumb on his left hand so that thumb-element (TE) touches finger-element F2A once. Such is signified by string "TA-F2A-1x" where "TA" is thumb-element (TE); "F2A" is finger element F2A; and "1x" means one tap. Similarly, the string "TA-F2A-2x" indicates that a user must move his thumb on his left hand so that thumb-element (TE) touches finger-element F2A twice to generate a character "B". The delay between "taps" is preferably user programmable. Similarly, to generate an "Enter" signal, a user moves the thumb on his left hand so that thumb element (TE) touches finger element (F4A).

Such configuration is simply one possible conversion scheme for associating hand/finger movements to actions to be performed by an electronic device. It will be appreciated by one of ordinary skill in the art that many table configurations and associated schemes may be used without departing from the scope and spirit of the present invention.

Mouse (or any suitable "pointer" device) movement is accomplished by associating the optical sensor (F4A) on the right-hand of universal glove (300) with a surface and moving the optical sensor in a desired direction. Such surface may be the thumb on the right hand or a table top or any suitable surface.

Table 360 presents the hand/finger motions required to generate motion commands or signals. The value " - - - " indicates such motion has not been defined. For table 360, curling a finger or a thumb causes an electrical change in one of the associated stretch sensors (TS, F1S, F2S, F3S, and F4S). Electronic module (312) uses the EMUL ID to look up the appropriate command format and were appropriate a signal format in the signal table, and a control or communication signal is transmitted to a remote electronic device. For example, moving the ring finger on the left-hand, so that the ring finger-element (F2A) touches palm-element (PE), would generate a ring finger curl motion signal and the ring finger-element activation signal that would notify processor (200) that the index finger was curled all the way to the palm. Process (200) would look up the appropriate command to issue and determine that a "volume up" command was needed, the type of signal required is an infrared remote control signal for TV ID 0020 and activate IR Transmitter (342) and transmit the appropriate command. For the configuration in table 360, the volume of a TV (ID 0020) would increase.

One of ordinary skill in the art will appreciate that a remote electronic device, such as a computer, can use the hand signals generated by universal wireless glove (300) as an User I/O device instead of the traditional keyboard and mouse and would be particularly useful in the virtual environment of virtual reality goggles where a construct of the users hands are projected within the virtual reality environment created by the goggles. Such technology would be particularly useful in converting sign language signals to voice or text.

Referring now to FIG. 12, a block diagram of one exemplary the universal wireless interface (300) electronic module (312) is presented. As depicted in FIG. 12, processor (200) is electrically associated with the various components of the electronic module via communication buss (202). Preferably, electronic module (312) includes RAM memory (324), flash memory (326), and ROM memory (328) a first transmitter and a second transmitter. Such memory can be used for storing glove configuration tables, signal format tables, and other data needed to operate the universal wireless controller (300). The first transmitter is a Bluetooth transmitter (322) and the second transmitter is an infrared transmitter (342). It will be appreciated than any type of transmitter technology may be used and that controller (300) may include any number of transmitter/receiver (radio) technologies such as WiFi and cellular transmitters. Restated, controller (300) may include any number to transmitter technologies including Bluetooth, WiFi, Cellular, and IR technologies. Controller (300) would simply select the transmitter technology needed for the signal to be generated. Programmable transmitters are well known in the art and are manufactured by companies such as Chipcon®. Notably, a signal type may be transmitted by more than one transmitter technology.

The glove sensors (i.e. finger-elements, thumb-elements, optical sensors, etc.) are electrically associated with electronic module (312) through communication data links (303) and (302). For one embodiment, such data links connect to various hand signals to a glove interface (201). Glove interface (201) is configured to power the glove sensor as needed and determine when a trigger event has occurred or is occurring and transfers a digital or analog representation of the generated hand signal to processor (200). For one embodiment, key matrix (314) may be associated directly with data links (303) and (302). Power (311) is electrically associated with the glove sensors as needed. For example, power (311) may supply power to the light source associated with the optical mouse sensor as well as the electromagnetic sensors. Further, the optical mouse sensor data links are electrically associated with mouse controller (310). IR transmitter (342) is used to generate control signals for devices such as televisions thereby performing the functions normally performed by the television's remote control (such as changing channels and increasing volume). GPS (216) is used as described above to generate location data for the electronic module (312). Similarly, the environmental sensors (221) can be any of the previously defined sensors for monitoring some parameter and generating data associated with such parameter. Where the environmental sensor (221) of interest is an accelerometer, controller (200) transfers such acceleration data along with the finger and hand movement data to a remote electronic device so that not only can finger movement be modeled in a virtual environment so can the movement of the associated hand and arm. Adding gyroscope data allows further virtual emulation capabilities. For example, a user could use an appropriately configured wireless glove controller to control a vehicle (e.g. car, plane, helicopter, etc.) simply by tilting his hand left and right and up and down and manipulating (curling, uncurling) his fingers to go faster or slower.

One of ordinary skill in the art will appreciate that by programming electronic module (312) with the appropriate glove-configuration-table, any electronic device can be controlled remotely using hand and finger motion and the same universal glove controller system can be used to control a polarity of functions. For example, with the appropriate glove-configuration-table and signal format tables (as needed) programmed into electronic module (312), a user can control the functions of his computer, the lighting in his room, the channel and associated volume of a program being viewed only television via simple hand and finger movements using the same universal wireless glove (300).

Wearable Controllers

Figure 15:
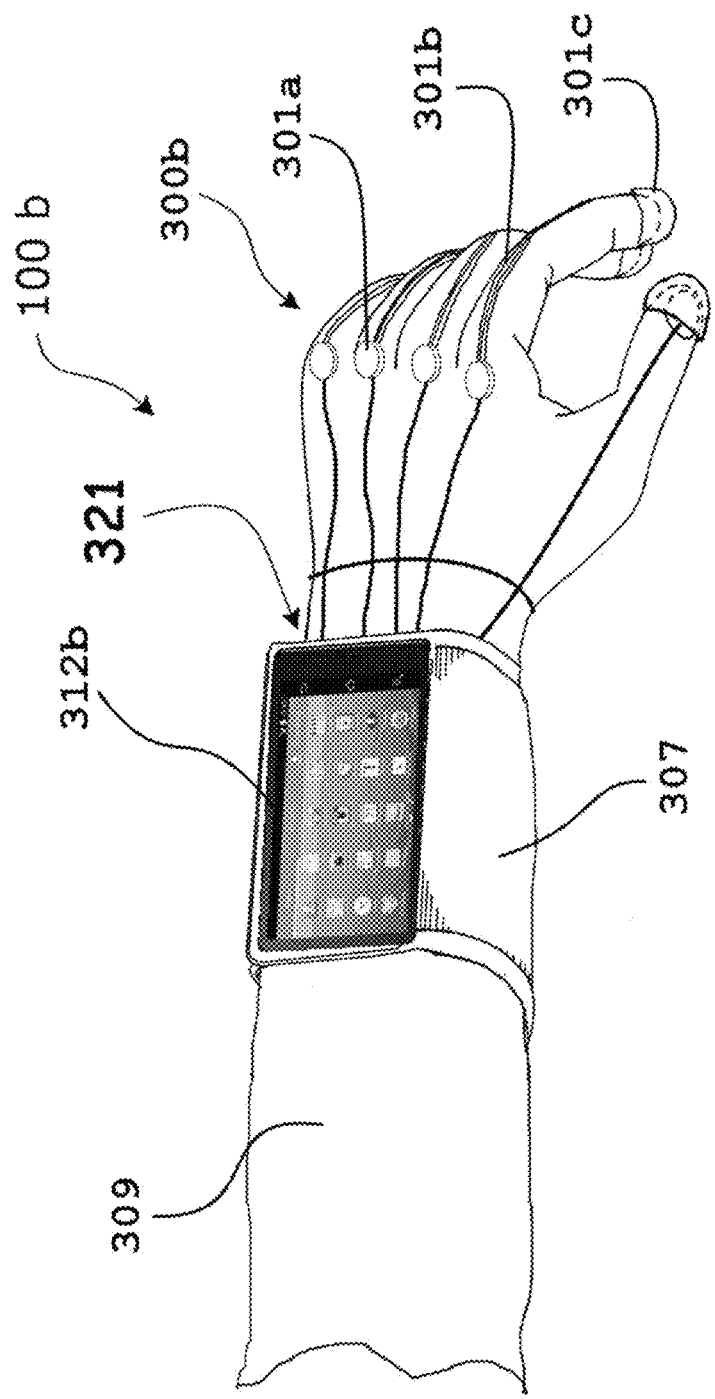
FIG. 15 is a side perspective view of a wearable arm controller associated with a control module.

Referring now to FIG. 15, one exemplary embodiment of a wearable controller (100b) configured to be associated with a user's arm (309) in the wrist area is presented. As depicted in FIG. 15, wireless controller (100b) is associated with a user's wrist using a device such as armband (307). Notably, wireless controller (100b) may be of any size suitable for a user's needs and unanticipated activities. Wireless controller (100b) is a universal wireless controller configured for controlling a plurality of electronic devices without the need for reprogramming or hardware modifications. Wireless controller (100b) defines a void (321) behind control module (312b) configured for receiving personality-modules that perform a specific function and establish a "personality" for the wireless controller (100b). For example, such personality module may be a security module configured to shoot electrodes at an attacker and stun such attacker with high voltage or spray a substance such as tear gas. Such personality-modules may be configured to do any function a user needs for the activity of interest and may better define the purpose of the wireless controller (100b). For example, a wireless controller (100b) with security personality modules may be called a wearable security controller.

For the currently preferred embodiment, a structure (300b) is configured for being associated with a user's hand.

One of ordinary skill in the art will appreciate that structure (300b) performs a similar function to universal wireless glove interface (300) without the "glove". Structure (300b) comprises at least one trigger-event-data generator (301). For the purposes of this document a trigger-event-data generator is a component that a user manipulates or "triggers" to cause the controller to respond in a desired way. Exemplary embodiments include switch-elements (301a) associated with a finger or knuckle and stretch-sensors (301b) associated with a finger or wrist or any object what can create a flex motion. Finger interfaces (301c) are configured for being associated with the fingertips of a user to better align stretch sensors (301b) along the user's fingers. Such finger interfaces (301c) may further define switches that generate trigger-event-data.

For alternative embodiment one "virtual glove" embodiment, structure (300b) is replaced using an imagining element (229) configured to detect user movements such as finger, hand and arm movements referred to as movement-data. Movement-data is a special type of trigger-event-data as movement-data is generated by an imaging element, not necessarily by mechanical manipulation of some component such as a user pressing a button. Thus, movement-data could be considered a type of trigger-event-data signal. For example, a user moves a finger as if to press a button, an imaging element detects such movement and transfers the associated movement-data to a processing device in controller (100b). The processing device uses such movement-data and a configuration table stored in memory to generate a controller-signal for a given trigger-event. Thus, using an imaging-element one can create a virtual glove controller. One of ordinary skill in the art will appreciate that the processing device would analyze the movement-data using software similar to facial. Restated, the processing device is configured to identify a user command from a digital image or video frame from a video source (imaging element) by comparing such movements with store movement-data images associated with a local or remote database.

For embodiments comprising a structure associated with a user's hand, please note that the term "switch-element" refers to components such as the previously defined finger-elements (F1A-F4c), knuckle-switches (K1-K4), stretch-sensors and finger interfaces (for some configurations). Further, trigger event data refers to the signals generated by or in conjunction with the switches or flex sensors or any trigger-element-data generator. A virtual glove configuration basically simulates such data using an imaging element to collect real time movement-data and compares same to stored movement-data as disclosed above.

Wireless controller (100b) further defines a control module (312b) or is configured for receiving a control module such as a cell phone. For the configuration where wireless controller (100b) defines a control module, such control module defines its own display and electronics and its functionality may be augmented by paring the controller with a cellphone.

Where wireless controller (100b) functions are performed by a removable communication module (controller module), such as a cellphone, structure (300b) preferably defines a docking-interface configured for receiving such communication device wherein said communication device is configured with a plurality of communication elements. Such removable communication module may comprise the various sensors or sensor interfaces or be electrically associated with such components. For such embodiment, wireless control module (100b) may not define an integral control module (just a docking interface). That said, embodiments where wireless control module (100b) defines an integral control module and a docking interface configured for receiving a cellular phone fall within the scope and spirit of the invention.

Control module (312b) comprises a processor (200) electrically associated with a memory (204), at least one sensor (220, 221, 322), and a plurality of communication elements (210, 252, 342) each such communication element configured to transmit a controller-signal. A controller-signal is a signal intended to be received by electronic devices where such electronic devices receive such controller-signal and responds accordingly. Processor (200) is further electrically associated the trigger-event-data generators (301) and configured to receive associated trigger-event-data.

Wireless controller (100b) further comprises or is electrically associated with at least one power source (208, 311) configured to supply power to the controller components. Such power supply may comprise or be associated with electrical paths for transferring power between the power source and an EM energy converter (209), a charger and other electronic devices electrically associated the power source.

As explained above, the control module is further configured to store in a memory at least one configuration table such as configuration table (350) containing control-data for a plurality of electronic devices. Exemplary control-data includes commands that instruct an electronic device what action to take. The electronic device may be any electronic device configured to receive control signals from Wireless controller (100b). Thus, one of ordinary skill in the art will appreciate that processor (200) is configured to use received trigger-event-data, typically generated by a user activating a trigger-event-data generator, and the control-data stored in configuration table (350) to generate a controller-signal and use at least one communication element to transmit such controller-signal to a remote device. Notably, more than one transmitter may be used. For example, the processor may use both Bluetooth and WiFi transmitters to transmit a controller-signal.

For one embodiment, trigger-event-data may be generated by voice. For such embodiment, there may or may not be components associated with a user's hand or fingers. The user simply speaks a predefined voice command and wireless controller (100b) interprets the voice command which becomes the trigger-event-data. Wireless controller (100b) will preferably be programmed with a plurality of languages. For one embodiment, a user can speak into wireless controller (100b) which would translate the sentence into a desired language and rebroadcast via an RF signal or sound signal to a remote person or device. Similarly, when wireless controller (100b) intercepts a sound or electronic message in a secondary language, such message is translated into a primary language and presented in sound or electronic form for viewing or hearing by the user. The user would set a primary language and all other languages would be considered secondary languages or set a language hierarchy.

The configuration table is preferably programmable. Further, wireless controller (100b) will preferably communicate with an external device and download programs such as applications to configure the Wireless controller for the plurality of functions of interest. Such application would further allow a user to program the configuration table for the devices the user wishes to control.

Preferably, the configuration table contains control-data for a plurality of remote devices including (a) a security system, (b) lighting system, (c) machine, (d) locking system, (e) entertainment system, (f) video system, (g) a propulsion system, (g) sound system, and (h) a data processing system. Notably the configuration tables stored by Wireless controller (100*b*) may contain control data for one or more items in each of the categories listed above. The only notable limitation on the number of devices that may be controlled would be the memory capacity of the memory used to store the configuration table(s) associated with Wireless controller (100*b*).

Consequently, one of ordinary skill in the art will appreciate that a user may use one wireless controller (100*b*) to control numerous devices without the need for programming changes or hardware changes. For one embodiment, Wireless controller (100*b*) comprises a display and is configured to be paired with a communication device such as a cellular phone. For such configuration Wireless controller (100*b*) would transfer at least part of the trigger-event-data to said cellular phone and the cellular phone would generate control-data and transmit a controller-signal to a remote device. Such controller would be configured to display controller-data and receiver-data. Receiver-data is simply data received from an external device via a two way communication path.

Preferably, at least one of the pluralities of communication elements comprises at least one transceiver configured for pairing the Wireless controller (100*a*) with at least one of (a) a local area network (LAN) and (b) a wide area network (WAN). Such a configuration allows a user to remotely control devices from anywhere in the world that provides access to such LAN or WAN.

As noted above, wireless controller (100*b*) is electrically associated with at least one sensor and preferably a plurality of sensors. Such sensors may include, for example, an accelerometer and a gyroscope. Such a configuration with the appropriate software algorithms would make wireless controller (100*b*) ideal for controlling a land vehicle or an air vehicle. Examples of air vehicles are planes, drones, hot air balloons, helicopters, or any machine or apparatus configured to fly above ground or propel through water or other fluids.

Hearable Device

Figure 16:
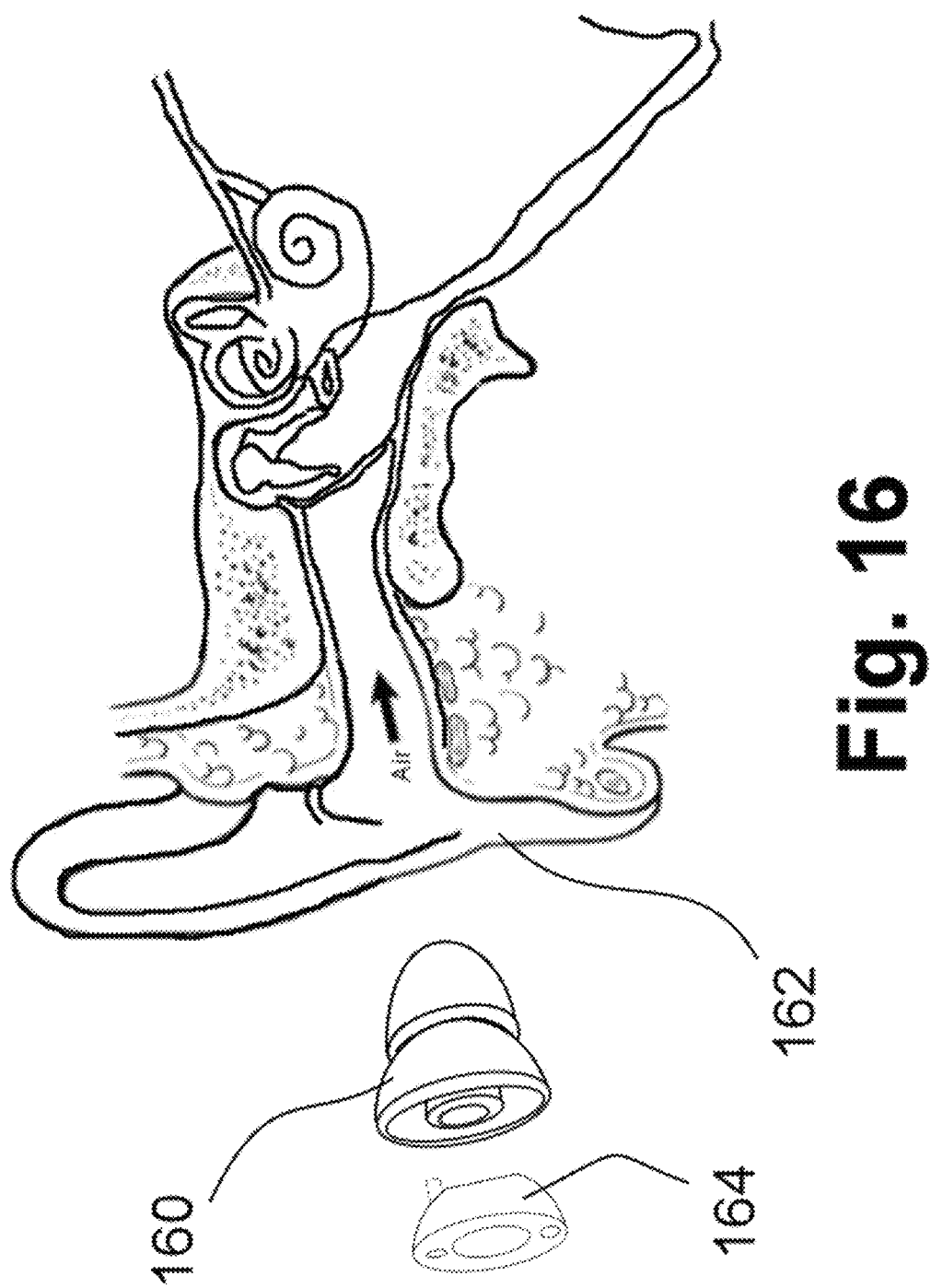
FIG. 16 is a side perspective image of a hearable device associated with a human ear.
Figure 17:
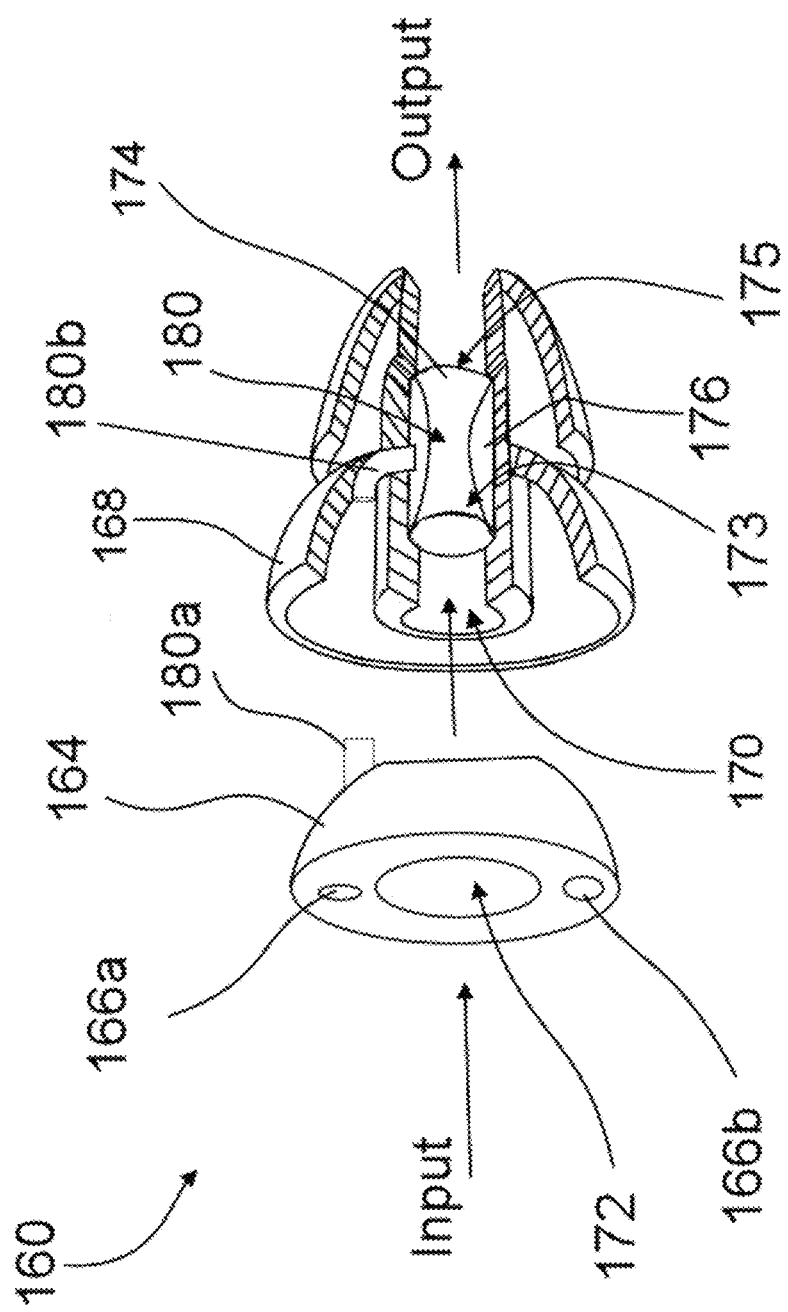
FIG. 17 is a side perspective exploded view of a hearable device with a partial cut away section.

Referring now more particularly to FIG. 16 and FIG. 17, exemplary embodiments of a hearable device (160) are considered. The term "hearable" refers to a wired/wireless electronic device that is configured to be associated with a user's ear to provide information to a user via audio signals/sound waves. The hearable device (160) preferably combines the benefits of wearable technology with the basic principle of audio-based information services, conventional rendition of music and wireless telecommunication. For the preferred embodiment, the hardware architecture of Hearable device (160) comprises: (a) Speaker(s) (242, FIG. 9), to convert analog signals to sound; (b) communication circuits (210, 250, FIG. 8, FIG. 9) (such as a Bluetooth IC to communicate with other devices such as a control module (312*b*) which may be a smartphone); (c) Sensors (220, 221) configured to monitor various parameters as described above including temperature, heart rate, cadence, or to detect proximity; and (d) Microphone(s). Such components have been discussed above.

As depicted in FIG. 17, hearable (160), configured for communication with an external data source, comprises an ear interface comprising a cone shaped housing (168) defining a cone void (170) there through configured with an audio funnel (174). The audio funnel (174) defines a funnel input (173) and a funnel output (175) associated with said cone void (170) to define an air tight cone pocket (176) there between. The audio funnel (174) is either integral to the cone design or disposed inside the cone void (170) so that sound that reaches the output preferably goes through the audio funnel (174). At least a part of the center portion of said audio funnel (174) preferably defines a resilient flexible region (180) so that a pressure applied to the outside of said audio funnel (174) via cone pocket (176) causes the walls of the audio funnel (174) to flex toward the center of the funnel (as depicted in FIG. 17) thereby defining an adjustable venturi. When there is no pressure in pocket (176) there is no venturi for the preferred embodiment. As pressure is applied the pocket (176) the venturi becomes more and more pronounced. One of ordinary skill in the art will appreciated that as the size of the venturi changes the audio frequencies passing through the venturi are affected to provide a tunable audio filter.

As best viewed in FIG. 17, pressure is introduced into cone pocket (176) using user input (166*a*) through conduits (180*a*) and (180*b*) and released by user input (166*b*).

An electronic module (164) defining a module void (172) there through is now considered. Electronic module (164) preferably comprises a processing device (200) electrically associated with a power source (208), memory (204), communication elements (210, 250), audio elements (242), and a venturi adjustor (166*a*). The electronic module (164) is either formed integral with said ear interface or is mechanically associated with the ear interface. As depicted in FIG. 16, the ear interface is suitably sized to fit into a user's ear canal.

For one embodiment, the ear interface forms a water tight seal with a user's ear and electronic module (164) is covered in a potting compound as described above for displays. Additionally, the module void (172) may be covered by a membrane to prevent water from enter the module void. The electronic module (164) is associated with the ear interface so that the module void is in audio communication with the cone void to selectively allow sounds generated by electronic module (164) or external to electronic module (164) to reach a user's ear.

The processing device (200) is configured to send/receive information to/from an external data source (such as a smartphone) and generate sound data in response to such received information. Such received information may be recreational data (such as music data) or informational data such as text to voice speech, a phone call, warning signal and similar data. Such sound data is transferred to a user's ear via the audio funnel (174) that is disposed in cone void (170) as previously described.

The audio funnel (174) is manipulated using by pressing user input (166*a*). Such "input" may simply be a pump that forces air into the cone pocket (176). Alternatively, input (166*a*) may be an electronic switch that instructs the processing device (200) to manipulate the audio funnel by creating pressure in pocket (176). Pressing user input (166*b*) releases the pressure by providing a vent path manually or via microprocessor actions.

For one embodiment, the hearable device (160) also provides an "ear plug" function where sound passing through the hearable device and to a user's ear is minimized or eliminated. Here the theory used is inspired by attributes of outer space. One of skill in the art will appreciate that outer space is one big vacuum. We know that a vacuum does has little or no air, and thus, has no medium to transfer sound waves or transfer heat. Thus, if one wish to create a sound or heat insulator it would be difficult to do better than a vacuum gap. For one embodiment of the invention, a vacuum gap is created between the module void (172) and the audio funnel output (175). Such can be achieved by blocking off the funnel output (175) and evacuating the air from the cone pocket and the audio funnel using user input (166b) as noted above (for reducing pressure in the cone pocket).

Preferably the external data source is one of a user module (112), electronic module (312, 312b) which may be a smartphone. For one embodiment, such external data source is controlled by a wearable universal controller (as previously disclosed) associated with said user.

Enigma System

The various electronic systems described above now provide for the creation of an Enigma System that allows a user to ubiquitously monitor his environment. Such Enigma system preferably comprises hearable device (160) in communication with a data source via an electronic module (312b) that stores a database or is in communication with a computer network (such as the Internet) comprising a data source. Such Enigma System further preferably a universal controller (300, 312b) that is capable of generating any number of control signals to operate any number of devices without hardware modification as previously described. Such controller may incorporate a virtual glove feature as described above.

As used here, the Enigma system "decodes" by selecting an item of interest in a user's environment and searches a local or remote database using the items image to find and present information about such item to a user.

For one exemplary embodiment, the enigma system configured for decoding items in a user's environment comprises a control module (312b) comprising a processing device (200) associated with a memory (204), a power source (208) and what will be called "feature elements". Feature elements include (i) a sensor array (220, 221), (ii) a plurality of communication circuits (210, 250), (iii) a location determining circuit (216), (iv) at least one imaging circuit (230), and (v) at least one audio circuit (240). Such feature elements are at least one of integral to the control module and electrically associated with the control module.

Preferably the enigma system includes a control-signal-generator (300) in communication with said control module. Such control-signal-generator is ether integral to or electrically associated with the control module as described previously and comprises a structure configured for being associated with a user's hand and configured to generate a control-signal in response to at least one of (a) user hand movements and (b) user finger movements as disclosed previously. Alternatively, a virtual glove configuration may be used.

Ideally the control module (312a) stores a plurality of item-control-data in its memory (204). The item-control-data contains information on signal parameters for controlling an item as described above regarding the previously described configuration tables. For this embodiment, the control module (312b) is configured to receive a control-signal from the control-signal-generator (300) and uses the item-control-data and the control-signal and at least one of the plurality of communication circuits to transmit an item-control-signal. Such functionally was previously described.

The control module (312b) is further configured to generate an environment-image (e.g. a video image or picture) of its environment using the imaging circuit (230). The control module automatically scans, based on predefined criteria (or in response to a user request), the environment-image and selects an item of interest image from said environment-image, uses the item of interest image to search at least one of the local memory (204) and a remote database (e.g. Internet) and generate at least one of a plurality of notifications comprising: (a) person identified notification, (b) device identified notification, and (c) warning notification.

Predefined criteria may be embodied by an algorithm that scans items in the following order: People, animals, terrain features, moving items, stationary items, and environmental features (air quality, chemicals, gases, water, temperature, etc.). When the Enigma system detects a person in a user's environment, such person becomes a person of interest and the control module generates image-data for such person of interest, executes a local and/or remote facial recognition software routine to identify the person. Once identified, the control module would access a contact list associated with the user to see if the person of interest is in such contact list. Additionally, if the person of interest is wearing identifying clothing (such as a uniform) the clothing is examined. In any event, the information gathered on a person of interest is passed on to the user.

Alternatively, a user could simply point to an item in the environment-image using touch screen technology or a "vertical glove" feature and instruct the control module (312b) what item to evaluate.

For one embodiment, the control module (312b) identifies an item of interest, the control module uses a local software or remote software service (e.g. Google® Image) to identify the item of interest, either automatically or via user command. Once the item if interest is identified, the control module determines if the control module (312b) has the item-control-data needed to control the item of interest stored in its memory (204). If so, such item profile becomes active, and the user is notified that the item is ready to be controlled by the control-signal-generator (300) and informs the user what movements to make to control the item of interest.

If the control module (312b) determines that the item-control-data for the item of interest is not stored in local memory, the control module accesses a remote data source, such as the internet, and uses the items image to search for item-control-data. If found, the item-control-data is downloaded to local memory (204) and the item profile becomes active as described about to allow a user to control an item.

One of ordinary skill in the art will appreciate that such a system allows a user to access and control items he comes across in his environment that he has never seen before.

For one environment, the control module is preferably continuously scanning its environment to identify sources of danger or unwanted situations and issues a warning notification. Such searches may be automatically performed using a warning algorithm in a similar manner as the person of interest algorithm above. Such algorithm may monitor electromagnetic field emissions (perhaps user wears a pacemaker susceptible to an electromagnetic field of a particular frequency and amplitude), police presence (should help be needed), human profile (friend nearby), air quality (too much $CO_2$ or smoke), inertia (fact moving objects on intercept course), and terrain warning (such as holes in sidewalk, road, ladder, etc.). As one example, as a user walks through a building the control module could might detect and note where exits in a building are, fire extinguishers locations, bathroom locations, office directory should the user need access to such information.

For one embodiment the enigma system may detect a danger using environment data, scan the internet for news, and present the user with proposed action plan. For example, if a terrorist is in the area there may be gun shots. The enigma system detects what seem to be gun shots, scans the news for information on a terrorist attack, examines real time location data for the user and proposes a path to safety. Similarly, the enigma system may detect smoke, scan the news for wild-fire information and access real time location data for the user and propose a path to safety and perhaps generate a time data for getting to safety.

The system my further be configured to detect a stalker. For this embodiment, the system documents people it detects over a predefined time period and notes when it detects the same person a predefined number of times over a predefined time frame or in a predefined number of locations. For example, the system my log 100 images when a user travels to a first location and then logs 100 more images when the user travels to a second location and logs 100 more images when the user travels to a third location. Of those 300 images, 1 is a repeat image at all three locations. The system would notify the user of the repeated detections and present an image of the person (or all three images so the user can verify it is the same person) and as much personal information as can be obtained about the person from local and remote databases.

For another application the enigma system is used in the health care field. The enigma system can be associated with a health module configured to take vital signs of a patient and record various physiological parameters of an animal being examined (human, dog, cat, horse, etc.).

The control module preferably allocates a block of memory sufficient to record a video image for a predefined period of time. The memory could form a circular buffer so that when the memory block is full the new video image starts overwriting the old video image. A user could then request control module to access such video image data and look for a specific person, place or thing.

It should be appreciated by one of ordinary skill in the art that a basic enigma system would work for all the applications described herein with more specialized tasks being aided by personality modules.

Methods of Using the Universal Wearable Controller

A few exemplary methods of using the disclosed universal wearable wireless controller are now presented. For one example, when a user associated with a wireless controller (100b) returns home, she can use her wireless controller (100b) to open the garage doors, turn on the lights in her garage, unlock her front door, and deactivate her security system. If she is attacked while trying to get into her house, she can use wireless controller (100b) configured with a deterrent module to deploy electrodes configured to stun the attacker and automatically call 911 to request assistance. She could use wireless controller (100b) to browse the contents of her refrigerator (a smart refrigerator configured to track its contents and communicate same to remote devices) and text such contents to her husband and children to determine what everyone wants to eat for dinner. She may then use wireless controller (100b) to turn on a television and or a music system and/or to call a friend. All such control features and many more would literally be at the tip of her fingers. Further, as noted above, such functionality is provided without the need for additional programming or hardware changes at least until the user acquires new devices. When the user acquires new devices, preferably such new devices with comprise a configuration table that is downloaded into wireless controller (100b) via a smart phone or directly to the wireless controller (100b). Hardware changes would only be required, typically, when new communication technologies are developed.

Controlling Land and Air Vehicles

Another example method of using the disclosed controller technology is the control of toy and non-toy land and air vehicles. Ideally wireless controller (100b) would hold his hand out flat when he wants a vehicle to continue straight in its current direction. The user would curl a finger to make the vehicle accelerate. The user would then tilt his hand to the right when he wanted the vehicle to turn right and tilt his hand to the left when he wanted to vehicle to turn left. Similarly, the user would tilt his hand upwards when he wanted the device to accelerate or climb (note that the controller can be configured so that two or more hand motions have the same result e.g. curling a finger or tilting a hand up to accelerate) and tilt his hand down when he wants the device to slow down or descend. Tilting the hand up and to the right would indicate the user wanted the device to increase its altitude and turn right at the same time. Ideally the device would have a camera located on board and in communication with the wireless controller (100b) and the video image would be displayed on the controller display for the user to view and/or on a remote display for anyone to view. Further, wireless controller (100b) may be configured to record all such video and audio data and other data received from a remote device.

One of ordinary skill in the art will appreciate that the above universal Bluetooth Glove controller can be used to control any appropriately configured electronic device that are too numerous to present in this document. Regarding computers, the configuration tables can define thumb and finger movements that perform any one of a plurality of functions such as scrolling, opening files, saving files, typing, surfing the Internet. Glove embodiments comprising audio features can be used with speech recombination software to add almost unlimited system control. The universal wireless glove controller can be used to control wheelchairs, to perform micro surgery using a computer interface, to create works of art and control/play musical instruments and associated recording devices as well as control a light show designed for a musical performance.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. An enigma system for decoding items in a user's environment, said enigma system comprising:
   a control module comprising a processing device associated with a memory and a power source;
   a sensor array electrically associated with said control module;
   a plurality of communication circuits electrically associated with said control module;
   a location determining circuit electrically associated with said control module;

at least one imaging-element in communication with said control module and configured to detect user movements and generate real time movement-data comprising a digital representation of a user movement;

a plurality of sample-movements data stored in said memory wherein each of said plurality of sample-movements data comprise a digital representation of a user movement;

a plurality of item-control-data stored in said memory wherein said item-control-data contains information relating to signal parameters for controlling a plurality of items;

wherein said control module is configured to generate an environment-image using said at least one imaging circuit and select an item of interest image from said environment-image, use the item of interest image to search at least one of said memory or a remote memory and generate at least one of: (a) a person identified notification, (b) a device identified notification, or (c) a warning notification;

wherein said control module is further configured to receive said real time movement-data and compare said real time movement-data with said plurality of sample-movements data to determine which of said plurality of sample-movements data match said real time movement-data thereby generating match-data;

wherein said control module is further configured to perform at least one of the following actions when the notification is a device identified notification: (1) access the appropriate item-control-data stored in said memory using said item of interest image, or (b) access a remote database using said item of interest image and download the appropriate item-control-data into said memory;

wherein said control module is further configured to use at least one communication circuit from said at least one of said plurality of communications circuits and generate an item-control-signal using said match-data.

2. An enigma system as in claim 1, wherein said control module automatically scans its environment and automatically selects an item of interest based on predefined criteria.

3. An enigma system as in claim 1, wherein said notification is a warning notification comprising at least one of: electromagnetic field detected, police, human profile, air quality or terrain warning.

4. An enigma system for decoding items in a user's environment, said enigma system comprising:

a processing means configured for executing a first logic comprising predefined commands;

a memory means for storing said first logic;

an audio means for detecting sound based signals and generating sound-data;

a communication means for transmitting a data signal using at least one of a plurality of communication formats;

an imaging means configured for detecting user movements and generating real time movement-data comprising a digital representation of a user movement and wherein said imaging means is further configured for generating environment-images;

a plurality of item-control-data comprising signal parameters for controlling a plurality of items;

a plurality of sample movements data stored in said memory means or a remote memory;

wherein said first logic causes said processing means to compare said real time movement-data with said plurality of sample movements data to determine which one of said plurality of sample-movements data matches said real time movement-data to generate match-data;

wherein said first logic further causes said processing means to automatically select an item of interest image from at least part of the environment-images, use the item of interest image to search at least one of said memory means or said remote memory for a match and generate at least one of a plurality of notifications comprising: (a) person identified notification, (b) device identified notification, or (c) warning notification;

wherein said first logic further causes said processing means to perform at least one of the following actions when the notification is a device identified notification: (a) searching said memory means using an item of interest image for the item-control-data associated with the item of interest; or (b) searching said remote memory using the item of interest image for the item-control-data associated with the item of interest image and downloading the item-control-data into said memory means; and wherein said first logic further causes said processing means to use one of: (a) the match-data and said communication means to generate an item-control-signal; or (b) audio-data and said communication means to generate an item-control-signal wherein said item-control-signal is used to control an item detected in the user's environment.

5. An enigma system as in claim 4, further comprising a structure associated with a user's hand and configured to generate a control-signal in response to at least one of (a) user hand movements and (b) user finger movements.

6. An enigma system as in claim 4, wherein said processing means automatically scans its environment and automatically selects an item of interest based on predefined criteria.

7. An enigma system as in claim 4, wherein said processing means is configured to be associated with personality modules configured for performing functions including security functions, health care functions, sporting functions and monitoring functions.

8. An enigma system as in claim 7, wherein said health care functions include at least one sensor for taking biological parameters of an animal being examined.

9. An enigma system as in claim 7, wherein said security functions include, at least one of detecting a stalker, shocking an attacker, generating risk data for an environment, or generating automatic communication signals.

* * * * *